United States Patent [19]

Sugahara et al.

[11] Patent Number: 5,727,151
[45] Date of Patent: Mar. 10, 1998

[54] MESSAGE CONTROL SYSTEM SPECIFYING MESSAGE STORAGE BUFFER FOR DATA COMMUNICATION SYSTEM WITH GENERAL PURPOSE AND ARBITRARY FORM BUFFERS

[75] Inventors: Hirohide Sugahara; Hajime Takahashi; Akira Kabemoto; Hideki Nakagawa, all of Kawasaki, Japan

[73] Assignee: Fujitsu Limited, Kawasaki, Japan

[21] Appl. No.: 859,397

[22] PCT Filed: Sep. 27, 1991

[86] PCT No.: PCT/JP91/01305

§ 371 Date: May 28, 1992

§ 102(e) Date: May 28, 1992

[87] PCT Pub. No.: WO92/06435

PCT Pub. Date: Apr. 16, 1992

[30] Foreign Application Priority Data

Sep. 28, 1990 [JP] Japan .................. 2-259389
Sep. 28, 1990 [JP] Japan .................. 2-259390
Sep. 28, 1990 [JP] Japan .................. 2-259392

[51] Int. Cl.$^6$ .............. G06F 15/163; G06F 15/17
[52] U.S. Cl. .............. 395/200.13; 395/876; 395/250; 395/200.12
[58] Field of Search ................ 395/200, 200.06, 395/200.12, 200.2, 250, 876, 200.13

[56] References Cited

U.S. PATENT DOCUMENTS

| | | | |
|---|---|---|---|
| 4,272,815 | 6/1981 | Kadowaki et al. | 395/275 |
| 4,424,565 | 1/1984 | Larson | 395/200 |
| 4,437,157 | 3/1984 | Witalka et al. | 395/275 |
| 4,777,595 | 10/1988 | Strecker et al. | 395/200 |
| 4,866,597 | 9/1989 | Kinoshita | 395/200 |
| 5,175,825 | 12/1992 | Starr | 395/325 |

FOREIGN PATENT DOCUMENTS

| | | |
|---|---|---|
| 20663 | 10/1983 | Australia . |
| 55-37642 | 3/1980 | Japan . |
| 57-8828 | 1/1982 | Japan . |
| 57-25028 | 2/1982 | Japan . |
| 58-106933 | 6/1983 | Japan . |
| 58-158732 | 9/1983 | Japan . |
| 58-158733 | 9/1983 | Japan . |
| 59-178049 | 10/1984 | Japan . |
| 61-95643 | 5/1986 | Japan . |
| 62-296640 | 12/1987 | Japan . |
| 84/04831 | 12/1984 | WIPO . |

*Primary Examiner*—Dung C. Dinh
*Attorney, Agent, or Firm*—Staas & Halsey

[57] ABSTRACT

A message control system is for a data communication system which takes the form of a loosely coupled multiprocessing system in which a plurality of processing modules respectively having a memory unit are coupled to each other via a system bus. In this message control system, a memory unit (13) within each processing module (10) includes a data processing part (14) which is a software running on a central processing unit (11) within its own processing module, and a buffer (16, 17) which stores a transmitting message. A connection unit (13) within each processing module (10) at least includes a plurality of logical transmitting ports (21) for successively reading out the message which is expanded in the buffer (16, 17) and transmits the same as a continuous message, a plurality of logical receiving ports (22) for storing the message, a transmission system connecting means (23), and a reception system connecting means (24).

21 Claims, 20 Drawing Sheets

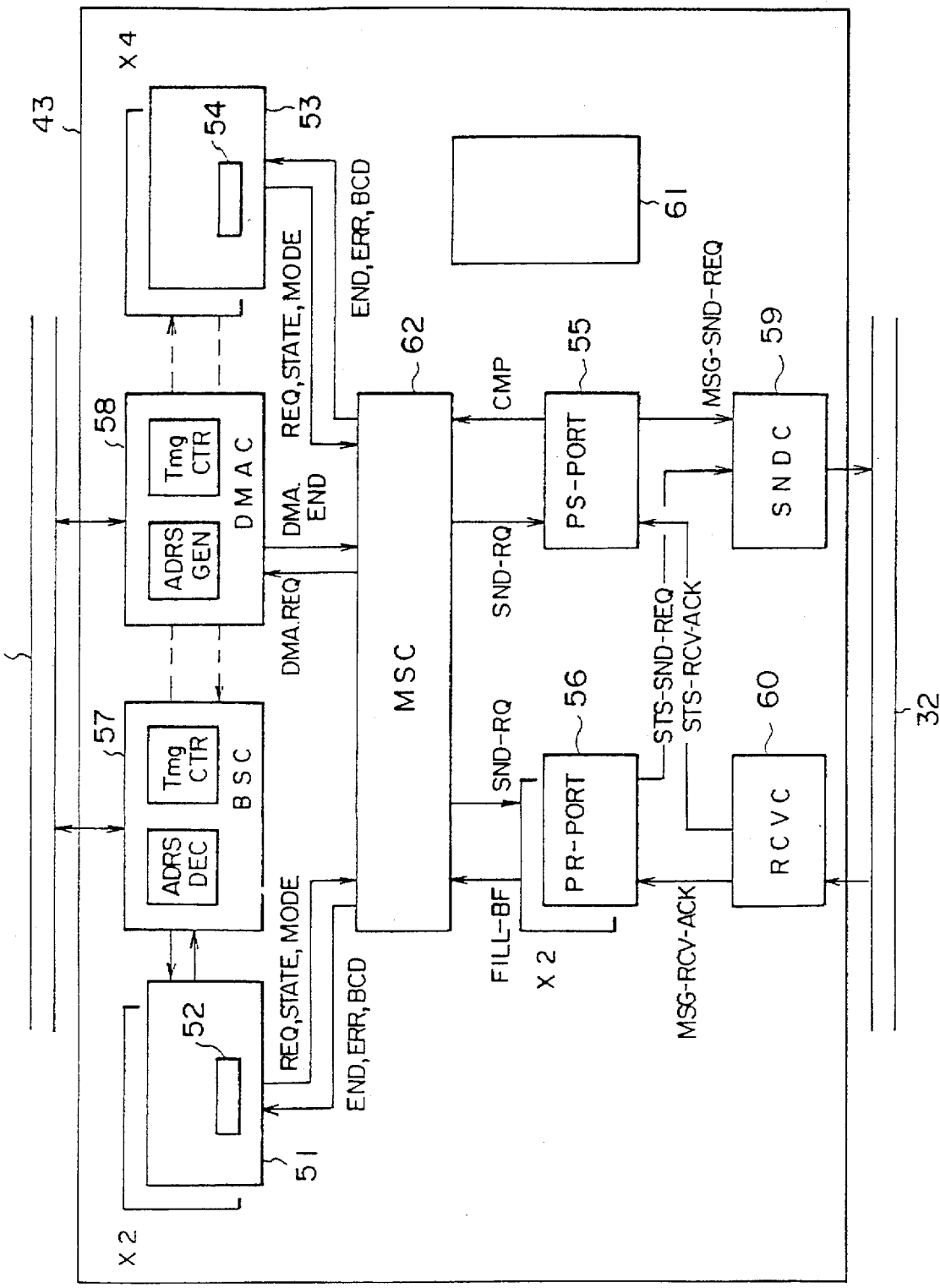

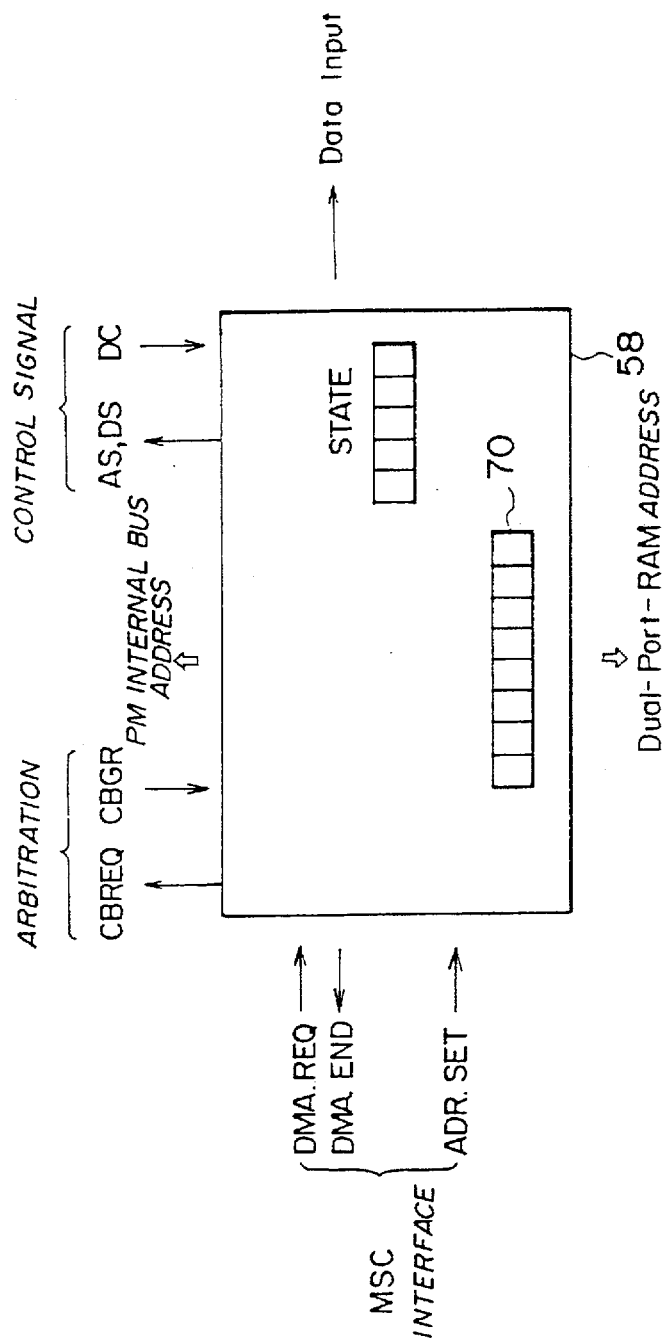

FIG. 11

| 0 ... 8 ... 16 ... 24 ... 31 | |
|---|---|
| D S A \| O\|O\|O\|O | SPDSA |
| M\|M | SPODF |
| I\|N | SPFCP |
| C D S A \| STATE | SPOPS |
| C S C | SPCST |

FIG. 12

| 0 ... 8 ... 16 ... 24 ... 31 | |
|---|---|
| D S A \| O\|O\|O\|O | RPDSA |
| M\|M | RPODF |
| I\|N | RPFCP |
| C D S A \| STATE | RPOPS |
| C S C | RPCST |
| S I D | RPSSI |

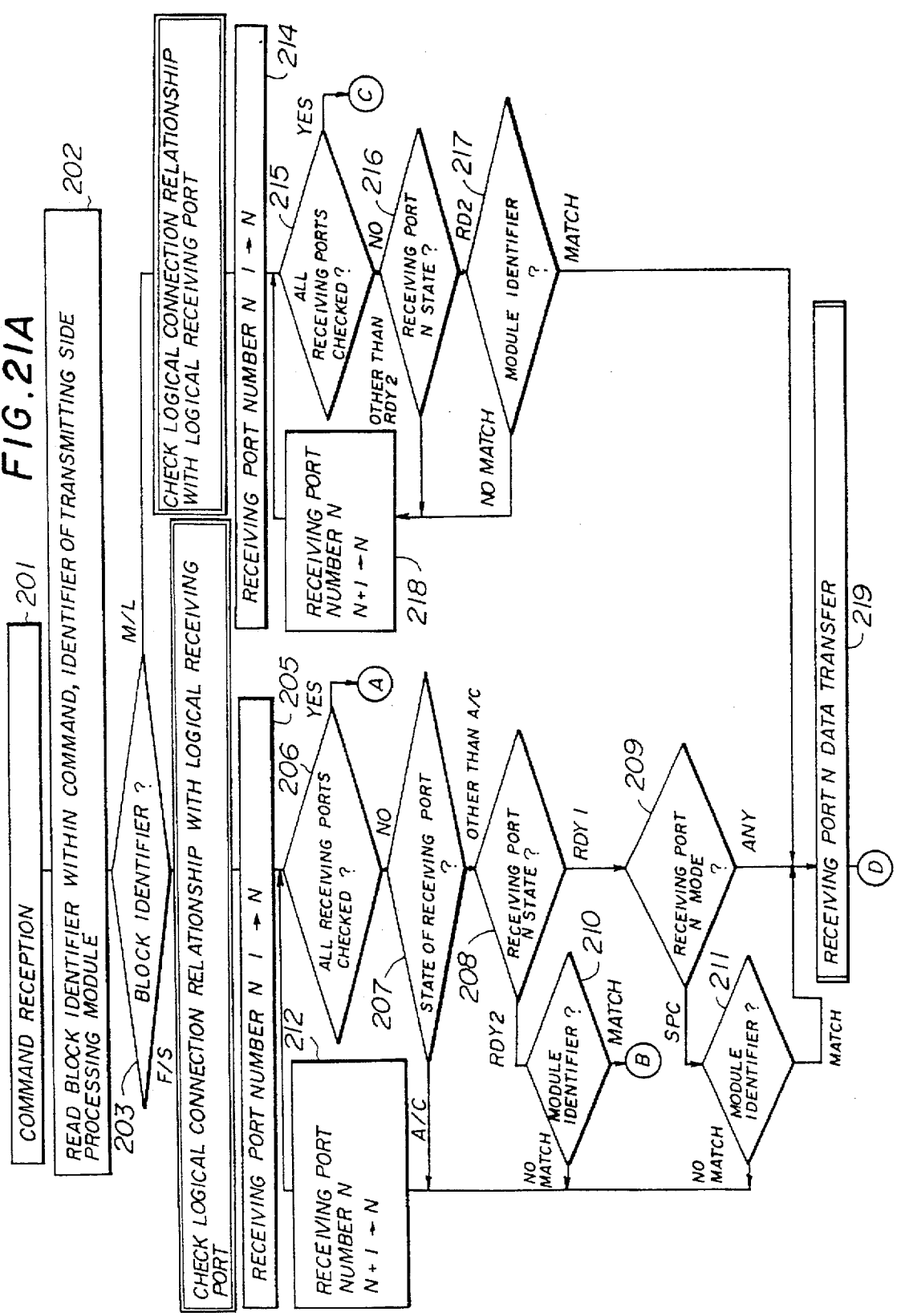

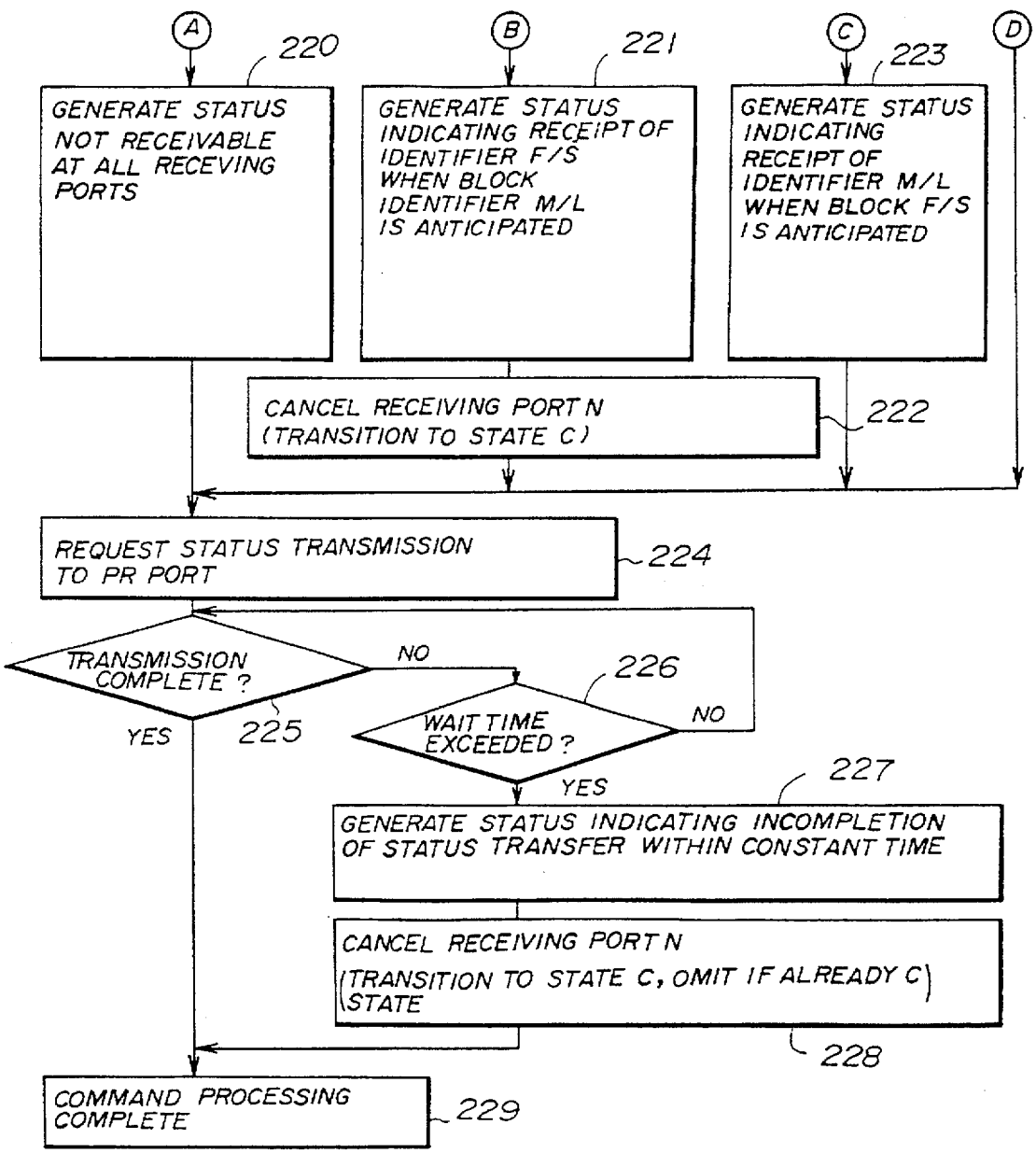

MESSAGE CONTROL SYSTEM SPECIFYING MESSAGE STORAGE BUFFER FOR DATA COMMUNICATION SYSTEM WITH GENERAL PURPOSE AND ARBITRARY FORM BUFFERS

BACKGROUND OF THE INVENTION

1. Field of the Invention

The present invention generally relates to message control systems for data communication systems, and more particularly, to a system for controlling messages among a plurality of processing modules which form a loosely coupled multiprocessing (LCMP) system.

2. Description of the Related Art

In data communication systems, one of the most important factors is to have a reliable system having a large processing capability. In order to satisfy this demand, multiprocessor systems have been put into wide use. In one system configurations utilizing a multiprocessor system, there is the loosely coupled multiprocessing (LCMP) system in which a plurality of independent computers are coupled by channel-to-channel adapters and the like to enable a job input and execution by any of the computers.

When implementing a message communication in a loosely coupled multiprocessing system, it is necessary to have a message communication which appropriately copes with the various control-end requests issued during the communication by a data processing system. In addition, it is necessary to realize a message control system which is able to simply set and release logical connections.

A typical microprocessor structure, has a tightly coupled multiprocessing (TCMP) system which incorporates a system configuration in which a plurality of microprocessors share a single memory device. However, communication systems in which the loosely coupled multiprocessing system in which each processor has its own memory device has been more widely in order to improve system performance when increasing the number of processor modules.

According to one such loosely coupled multiprocessing system, general purpose buffers having the same construction are used for the buffers which are provided on the transmitting side and the receiving side as message storage regions, and message transfers are made between these general purpose buffers.

When making message communications using such general purpose buffers, messages which are a subject of the communication cannot be stored at one time in the general purpose buffer if the amount of data involved in the message large and/or voluminous, and for this reason, it is necessary to communicate the message in divisions.

When executing the message communication according to a divisive method at the transmitting side of a processing module, the message which is the subject of the transmission must be expanded to the general purpose buffer from the original memory position. In addition, at the receiving side processing module, it is necessary to expand the message which is received at the general purpose buffer to the requested memory position. For this reason, it conventionally takes too much time to make the message transmission and reception process if the amount of data involved in the message is large and/or voluminous.

On the other hand, only one transmitting port is conventionally provided as the communication port for the software (functioning as the data processing part) of the transmitting side processing module to carry out the function of transmitting the message to other processing modules. In addition, only one receiving port is normally provided to carry out the function of receiving the message transmitted from other processing modules.

If only one transmitting port and one receiving port can be utilized by the communications software, the software cannot transmit a plurality of messages simultaneously, and at the same time, cannot receive a plurality of messages simultaneously. Hence, conventional message control systems of the type just described cannot realize simultaneous transmission and reception processes for a plurality of messages, and accordingly, there is a problem in that data processing cannot be carried out efficiently.

Furthermore, since only one receiving port is provided, if the receiving port is in use and an emergency message is to be transmitted, there is problem in that the emergency message cannot be promptly transmitted to notify the appropriate receiving processing module.

SUMMARY OF THE INVENTION

The present invention takes the above-described deficiencies of the systems briefly described above into consideration, and an object of the invention is to provide a message control system for a data communication system which employs loosely coupled processing modules, and is capable of realizing simultaneous transmission and reception processes of a plurality of messages utilizing a small scale solution.

Additionally, another object of the present invention is to provide a message control system for a data communication system, which can at any time communicate a large amount of messages in a transmitting side initiated manner.

A further object of the present invention is to provide a message control system for a data communication system which can receive an emergency message without a waiting time by providing a plurality of logical receiving ports.

These and other objects are achieved by the present invention in that disposed is a message control system for a data communication system which employs a loosely coupled multiprocessing system structure in which a plurality of processing modules have a central processing unit, a memory unit and a connection unit are connected to each other via a system bus. The memory unit of the processing module includes a data processing part which is a software construct running on the central processing unit, and a buffer in which a transmitting message is expanded and stored. The connection unit at least includes a plurality of logical transmitting ports for successively reading out the message developed in the buffer and transmitting the same as a continuous message, a plurality of logical receiving ports, a transmission system connecting means, and a reception system connecting means.

The above-described transmission system connection unit simultaneously logically connects the plurality of logical transmitting ports and the processing module at the communication destination. In addition, the above reception system connection unit simultaneously and logically connects the plurality of logical receiving ports and the processing module at the communication destination. According to the present invention, simultaneous transmission and reception of a plurality of messages can be made because a plurality of logical transmitting ports and logical receiving ports are provided.

The present invention also provides a message control system in which the buffer within the memory unit includes a general purpose buffer which is generally provided to store a message, and an arbitrary form buffer which is captured at any time by the data processing part which runs on the central processing unit with a format in conformity with processing thereof.

According to the present invention, the general purpose buffer can be used to make the message communication which is transmitting side initiated, and the transmission and reception of a large amount or data involved in a message possible when using the arbitrary form buffer because it is possible to obtain a large memory capacity.

In addition, the present invention provides a message control system in which at least two or more logical receiving ports are used for the normal communication process, and the remaining at least one logical receiving port is allocated for the emergency communication process. According to the present invention, an emergency message communication can be made during the normal message communication process without disturbing this communication process, and thus, it is possible to promptly execute a recovery process to the normal state when an abnormality is generated.

Furthermore, the present invention provides a message control system in which one or more physical transmitting ports which manage the transmission protocol to the system bus and one or more physical receiving ports which manage the reception protocol are provided within the connection unit, the logical connections set between the logical transmitting ports and the physical transmitting ports are successively renewed by the transmission system connection unit, and the logical connections set between the logical receiving ports and the physical receiving ports are successively renewed by the reception system connection unit.

According to the present invention, by the above transmission system connection unit, the message transmission can be made by the logical transmitting port using the same physical transmitting port in common, and the number of physical transmitting ports can be made smaller than that of the logical transmitting ports. In addition, by the above-described reception system connection unit the message reception can be made by the logical receiving port using the same physical receiving port in common, and the number of physical receiving ports can be made smaller than that of the logical receiving ports. Therefore, according to the present invention, the scale of the hardware of the logical connection unit can be made small even though a plurality of logical transmitting ports and logical receiving ports are provided.

BRIEF DESCRIPTION OF THE DRAWINGS

FIG. 4 is a structural diagram of an embodiment of a connection unit according to the present invention.

FIG. 7 is a diagram of the input and output signals of a memory access control unit according to the present invention.

FIG. 11 is a diagram which shows an example of data written in a control register of a logical transmitting port according to the present invention.

FIG. 12 is a diagram which shows an example of data written in a control register of a logical receiving port according to the present invention.

FIGS. 21A and 21B are flow charts which illustrate an embodiment of the command processing operation at the time of command reception according to the present invention.

DETAILED DESCRIPTION OF THE PREFERRED EMBODIMENTS

Figure 1:
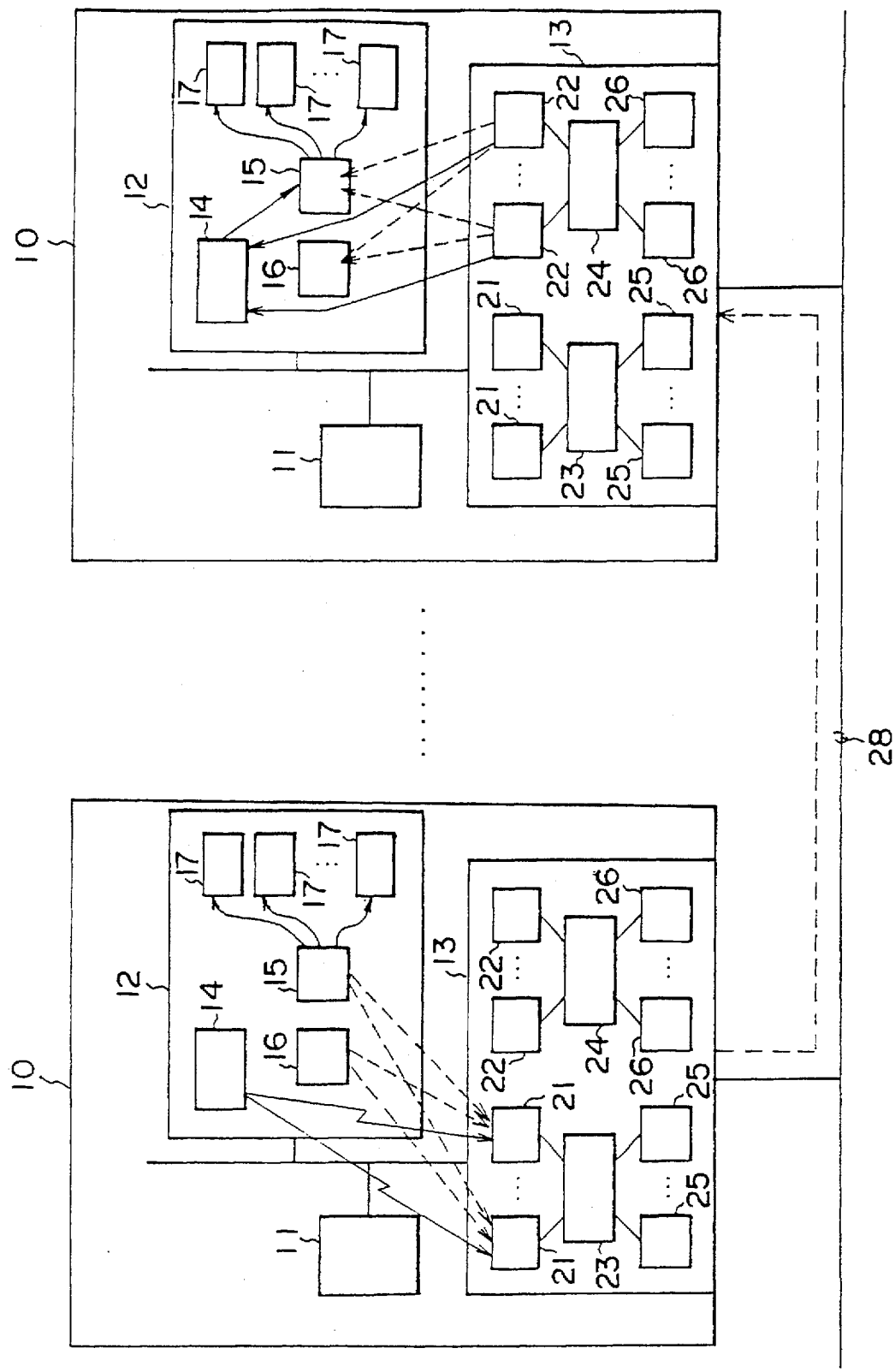
FIG. 1 is a block structural diagram of a principle present invention.

Referring now to FIG. 1 therein depicted is a block structural diagram of the present invention. A plurality of processing modules 10 are connected to each other via a system bus 28 and form the above described loosely coupled multiprocessing system. Moreover, FIG. 1 shows a case where a message is transmitted from the processing module 10 on the left hand side to the processing module 10 on the right hand side. Each processing module 10 includes a central processing unit 11, a memory unit 12 which is only accessible by central processing unit 11, and a connection unit 13 which forms an interface between the memory unit 12 and a system bus 28.

The memory unit 12 includes a data processing unit 14, a descriptor 15, a general purpose buffer 16 and an arbitrary form buffer 17. The data processing part 14 is formed by a software system which is expanded in the memory unit 12 and is executed or runs on the central processing unit 11. The data processing part 14 carries out a predetermined data processing depending on data information which is exchanged by message communications between other processing modules 10.

The descriptor 15 manages the arrangement address and the data length information of the general purpose buffer 16 or the arbitrary form buffer 17 in the form of a chain. General purpose buffer 16 is generally provided to store a message. Additionally, the arbitrary form buffer 17 is captured according to a capture indication from the transmitting side processing module 10 at any time with a format which conforms to the processing of the data processing part 14 itself.

The connection unit 13 includes a plurality of logical transmitting ports 21, a plurality of logical receiving ports 22, a transmission system connection unit 23, a reception system connection unit 24, one or more physical transmitting ports 25, and one or more physical receiving ports 26. The logical transmitting port 21 successively reads out the message developed in the buffer 16 or 17 and transmits the same as a continuous message. The logical receiving port 22 successively stores the message which is transmitted in the buffer 16 or 17.

The physical transmitting port 25 manages the transmission protocol to the system bus 28, and is logically connected to the logical transmitting port 21 by the transmission system connection unit 23. The physical receiving port 26 manages the reception protocol to the system bus 28, and is logically connected to the logical receiving port 22 by the reception system connecting means 24.

Now, a description will be given of the effects of the present invention by again referring to the structural diagram depicted in FIG. 1. When there is a need to transmit the message, the data processing part 14 of the transmitting side processing module 10 (i.e., the left hand side of FIG. 1) requests a message transmission process with respect to the logical transmitting port 21 of the connection unit 13. Responsive to this request, the logical transmitting port 21 of the transmitting side processing module 10 reads out from the buffer 16 or 17 of its processing module 10 the message which is the subject of the transmission in sequence in units of the transfer block of the physical transmitting port 25, and the read out message is transmitted to the system bus 28 by adding an identifier of the processing module 10 at the transmitting destination.

If the logical transmitting port 21 is available, the data processing part 14 of the transmitting side processing module 10 successively issues message transmission requests if the message transmission is necessary, and the plurality of logical transmitting ports 21 simultaneously enter a transmission process state.

In the transmission process state, the transmission process (i.e., which may be a transmission process in units of messages) of the message block of the logical transmitting port 21 which has the logical connection ends, the transmission system connecting means 23 releases the logical connection between the logical transmitting port 21 in which the transmission is ended and sets a new logical connection between the next logical transmitting port 21. Additionally, the transmission system connecting unit 23 starts to transmit the message block of the newly logically connected logical transmitting port 21 via the physical transmitting port 25 which it logically connects. By repeating such a process, the plurality of logical transmitting ports 21 can simultaneously transmit independent messages with respect to the processing module 10 at the communication destination.

Therefore, according to the present invention, the data processing part 14 can issue the request to simultaneously transmit a plurality of messages to the connection unit 13, and thus, it is possible to execute a simultaneous message transmission process.

In addition, because the transmission system connecting unit 23 carries out the above-described control so that the message transmission is made while the plurality of logical transmitting ports 21 commonly use the same physical transmitting port 25, the number of physical transmitting ports 25 can be made smaller than that of the logical transmitting ports 21. Further, since only one transmission system connecting unit 23 is necessary (of course, more than one may be provided), the scale of the hardware of the logical connecting units between the logical transmitting port 21 and the processing module 10 at the communication destination can be made small.

On the other hand, in the present invention, if it is necessary to receive a message, the data processing part 14 of the receiving side processing module 10 requests the message reception process with respect to the logical receiving port 22 of the connection unit 13. Responsive to this request, the logical receiving port 22 of the receiving side processing module 10 enters a receiving state, and a series of message blocks of the same message intended for its processing module and input via the physical receiving port 26 are stored in the buffer 16 or 17 in sequence.

Hence, the system enters the reception process state with respect to the transmitting side initiated message transmission. If the logical receiving port 22 is available, the data processing part 14 of the receiving side processing module 10 successively issues message reception requests when the message reception is necessary, and a plurality of logical receiving ports 22 simultaneously enter the reception process state.

In the reception process state, if a plurality of physical receiving ports 26 are provided and the transfer process of the received message block to the logical receiving ports 22 from the physical receiving port 26 which is logically connected ends, the reception system connecting units 24 releases the logical connection between the physical receiving port 26 for which the reception process ended. Additionally, the reception system connecting means 24 sets a new logical connection between the next physical receiving port 26, and executes the process of transferring the received message block of the physical receiving port 26 to the logical receiving port 22 depending on the new logical connection.

On the other hand, if only one physical receiving port 26 is provided and the transfer process of the received message block to the logical receiving port 22 which is logically connected ends, a new logical connection is set between the logical receiving port 22 which is the receiving destination of the newly received message block, and the process of transferring the received message block of the physical receiving port 26 to the logical receiving port 22 is executed depending on the new logical connection.

Accordingly, in the present invention, the data processing part 14 of the receiving side processing module 10 can issue with respect to the connection unit 13 a request to simultaneously receive a plurality of messages, and thus, it is possible to execute a process of simultaneously receiving the messages.

The reception system connecting units 24 carries out a control so that the message reception is executed while the plurality of logical receiving ports 22 use the same physical receiving port 26 in common, and thus, the number of physical receiving ports 26 can be made smaller than that of the logical receiving ports 22. Furthermore, the present invention only requires one reception system connecting units 24 (of course, more than one may be provided), and the scale of the hardware of the logical connecting units) between the logical receiving port 22 and the processing module 10 at the communication destination can be made small.

Additionally, when executing the transmitting side initiated message transmission in the present invention, the data processing part 14 of the transmitting side processing module 10 can request to add an identifier which specifies the use of the general purpose buffer 16 which is prepared in advance as a reception buffer if requesting the execution of the message transmission with respect to the logical transmitting port 21 of the connection unit 13. Responsive to this request, the logical transmitting port 21 of the transmitting side processing module 10 transmits the message by adding to the transmitting message the identifier which specifies the use of the general purpose buffer 16.

When the logical receiving port 22 of the receiving side processing module 10 detects that it is specified as the destination of the message and the message is added with the identifier which uses the general purpose buffer 16, the logical receiving port 22 stores the transmitted message in the general purpose buffer 16 within its own processing module 10, and thus, it is possible to execute the reception process for the message transmission which is transmitting side initiated.

On the other hand, when executing the transmission process for a large amount of message, the data processing part 6 of the transmitting side processing module 10 first notifies the receiving side processing module 10 of the message quantity information related to the large amount of data for that message or messages message which is to be transmitted, according to the message transmission which specifies the use of the general purpose buffer 16.

Responsive to this notification, the data processing part 14 of the receiving side processing module 10 prepares the arbitrary form buffer 17 corresponding to the notified amount of message within the memory unit 12 of its own processing module 10, and generates the descriptor 15 by pointing to the arrangement address and the data length information in the storing sequence.

Next, the data processing part 14 of the transmitting side processing module 10 requests to add an identifier specifying the use of the arbitrary form buffer 17 as the reception buffer, and issues the message transmission request. Responsive to this request, the logical transmitting port 21 of the transmitting side processing module 10 transmits the message by adding to the transmitting message the identifier which specifies the use of the arbitrary form buffer 17.

If the logical receiving port 22 of the receiving side processing module 10 detects that it is specified as the destination of the message, the message is added with the identifier which uses the arbitrary form buffer 17 and the transmitting source is the processing module which specifies the formation of the arbitrary form buffer 17, the logical receiving port 22 refers to the descriptor 15 and stores the transmitted message in the arbitrary form buffer 17 which is formed within its own processing module 10.

By using this arbitrary form buffer 17, the transmitting side processing module 10 can make the message transmission without being restricted by the memory capacity of the general purpose buffer 16 because the buffer having the large memory capacity is used on the receiving side. Furthermore, the receiving side processing module 10 can directly receive the message at the address position desirable for the data processing part 14.

When making the above processing, the transmitting side processing module 10 desirably stores the message which is the subject of the transmission in the arbitrary form buffer 17 which is formed in its own processing module in accordance with the transmission of the large amount of message. However, it is also possible to store the message in the general purpose buffer 16.

In the present invention, when making the message transmission in conformance with the normal communication process, the logical transmitting port 21 of the transmitting side processing module receives the request from the data processing part of the transmitting side processing module 10, and transmits the message by adding the identifier which indicates the normal communication process to the transmitting message.

On the other hand, when making the message transmission in conformance with the emergency communication process, the logical transmitting port 21 receives the request from the data processing part 14 similarly to the above case and transmits the message by adding the identifier which indicates the emergency communication process to the transmitting message.

When the message transmitted from the transmitting side processing module 10 has as the destination the logical receiving port 22 of the receiving side processing module 10 which is set to function for the normal communication process, the logical receiving port 22 itself operates as the receiving port if the identifier which indicates the normal communication process is added to the received message, and the transmitted message is stored in the buffer 16 or 17 of its processing module 10. On the other hand, if the identifier which indicates the emergency communication process is added to the received message, the logical receiving port 22 itself of the receiving side processing module 10 which is set to function for the emergency communication process operates as the receiving port, and the transmitted message is stored in the buffer 16 or 17 of its own processing module 10.

Figure 2:
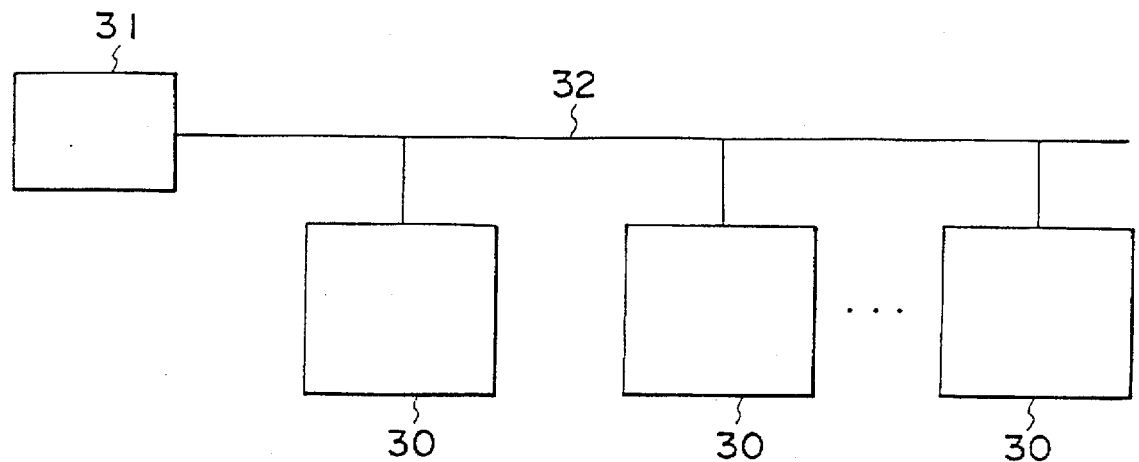
FIG. 2 is a block diagram of the system structure of a multiprocessor system according to the present invention.

Next, a further detailed description will be given of an embodiment of the present invention. FIG. 2 shows a system structural diagram of a multiprocessor system to which the present invention is applied. In the multiprocessor system, a plurality of processing modules 30 (corresponding to the above processing modules 10) are mutually connected via a common system bus 32 (abbreviated as S-BUS in the figure) the arbitration of which is centrally managed by a system bus handler 31. In this figure, the common system bus 32 is shown as a single bus, but a plurality of common system buses 32 may be provided to connect each of the processing modules 30 via the independent common system buses 32.

Figure 3:
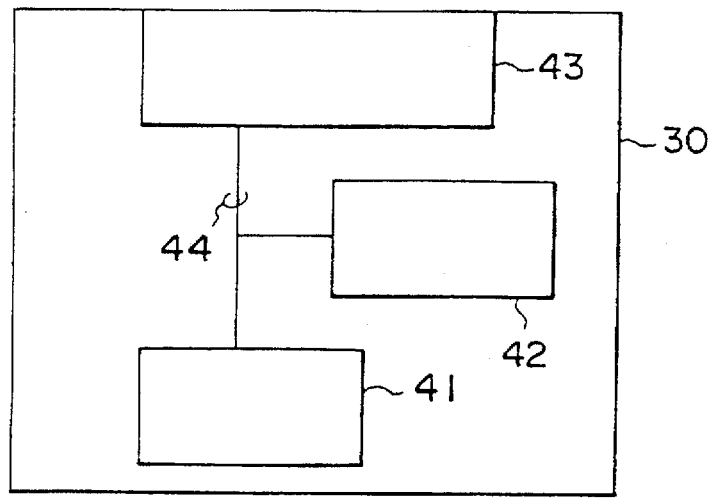
FIG. 3 is a block structural diagram of a processing module according to the present invention.

FIG. 3 shows a detailed structural diagram of the processing module 30. The processing module 30 includes a central processing unit 41, a local storage unit 42 of a main memory which is locally provided to form the loosely coupled relationship, a connection unit 43 which is provided to process the connection to the common system bus 32, and an internal bus 44 for connecting these units. The central processing unit 41 corresponds to the above central processing unit 11, the logical storage unit 42 corresponds to the above memory unit 12, and the connection unit 43 corresponds to the above connection unit 13.

In the processing module 30, the softwares which operate on the central processing unit 41 and the local storage unit 42 run, and a series of operations is carried out when the softwares mutually cooperate while becoming the communication request source. The central processing unit 41 provided in the processing module 30 fetches the instruction code only from the ROM (not shown) and the local storage unit 42 within its own processing module. In addition, the connection unit 43 is assigned a specific unit number.

FIG. 4 shows an embodiment of the connection unit 43 which is provided to realize the message communication process of the present invention. In FIG. 4, the connection unit 43 includes a logical transmitting port (S-OPRT) 51 which is a transmitting port which can see the software running on the central processing unit 41, a logical receiving port (R-PORT) 53 which is a receiving port which can see said software, a physical transmitting port (PS-PORT) 55 which controls the message transmission to other processing modules 30, a physical receiving port (PR-PORT) 56 which controls the message reception from other processing modules 30, an access control unit (BSC) 57 which processes the interface between the internal bus 44, a memory access control unit (DMAC) 58 which makes access to the local storage unit 42 shown in FIG. 3, a transmission control unit (SNDC) 59 which processes the transmission process interface between the common system bus 32, a reception control unit (RCVC) 60 which processes the reception process interface between the common system bus 32, a dual port random access memory (RAM) 61 which enables dual access, and a main sequence control unit (MSC) 62 which manages the control of the entire unit. The logical transmitting port 51 has a control register 52, and the logical receiving port 53 has a control register 54. These control registers 52 and 54 may be provided in the dual port RAM 61.

The logical transmitting port (S-PORT) 52 corresponds to the above logical transmitting port 21, and for example, two such ports are provided as in this embodiment, and two or more such ports are preferably provided. The logical receiving port (R-PORT) 54 corresponds to the above logical receiving port 22, and for example, four such ports are provided as in this embodiment, and four or more such ports are preferably provided. Accordingly, the software which runs on the central processing unit 41 enables simultaneous transmission of a plurality of messages and enables simultaneous reception of a plurality of messages.

On the other hand, the physical transmitting port (PS-PORT) 55 corresponds to the above physical transmitting port 27, and one such port is provided due to its character. The physical receiving port (PR-PORT) 56 corresponds to the above physical receiving port 25, and for example, two such ports are provided in this embodiment, and a number of such ports smaller than the number of the logical receiving ports 54 and being one or more is preferably provided. In addition, as will be described later, by employing a control system in which the plurality of logical transmitting ports 51 use the physical transmitting port 55 in common and the plurality of logical receiving ports 54 use the physical receiving port 56 in common, it is possible to reduce the amount of the hardware of the connection unit 43. In a case where a function is provided on the side of the common system bus 32 from the physical transmitting port 55 to serialize the process of the physical transmitting port 55, it is possible to provide not one but a plurality of physical transmitting ports 55.

A 256-byte holding buffer corresponding to the physical transfer block on the common system bus 32 is provided in the dual port RAM 61 for each of the logical transmitting port 51 and the logical receiving port 53. The number of holding buffers belonging to the logical transmitting port 51 corresponds to the number of physical transmitting ports 55, and the number of holding buffers belonging to the logical receiving port 53 corresponds to the number of physical receiving ports 56.

The physical transmitting port 55 is logically connected to the logical transmitting port 51 according to the control process of the main sequence control unit (MSC) 62, and the transfer request MSG-SND-REQ of the message block within the holding buffer belonging thereto is issued to the transmission control unit (SNDC) 59. The answer STS-RCV-ACK with respect to the transmission of this message block is received by the reception control unit 60, and the physical transmitting port 55 executes the process of notifying the logical transmitting port 51.

Figure 5A:
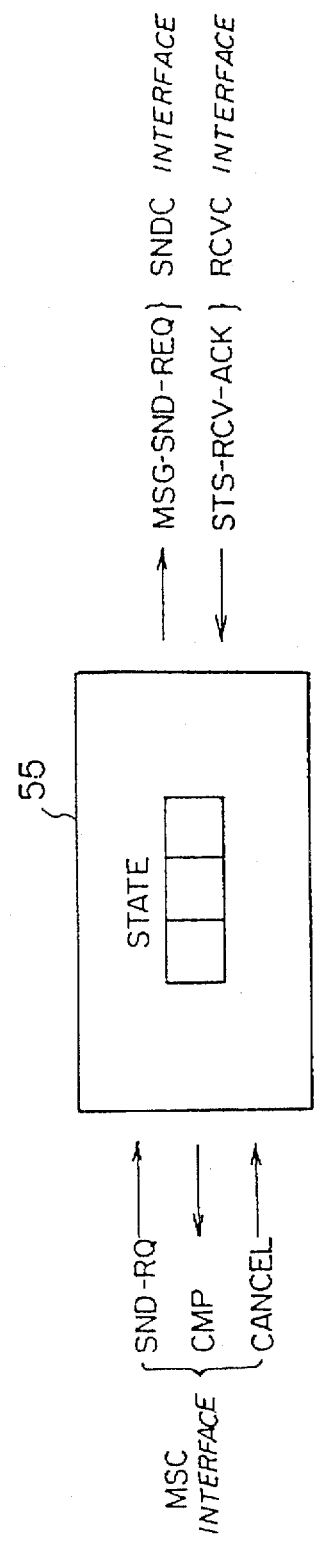
FIG. 5 is an operation state transition diagram for input and output signals in an embodiment of a physical transmitting port according to the present invention.
Figure 5B:
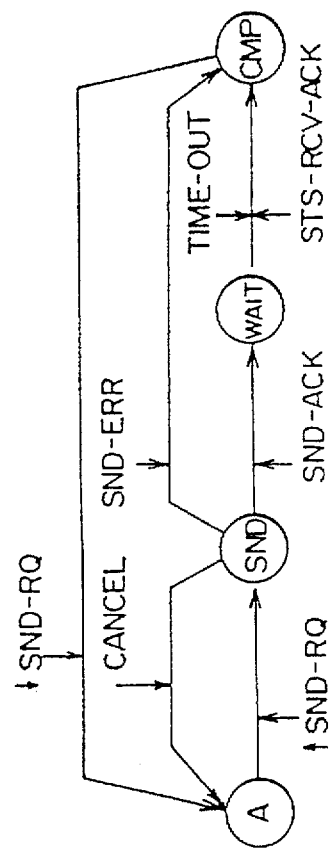

The input and output signals of this physical transmitting port (PS(PORT) 55 are shown in FIG. 5(a), and an embodiment of the state transition of this process is shown in FIG. 5(b). As shown in FIG. 5(a), the cancel request (CANCEL) and the message transmission request SND-RQ from the main sequence control unit (MSC) 62 are input to the physical transmitting port (PS-PORT) 55, and the physical transmitting port 55 makes a process resume request CMP with respect to the MSC 62.

As shown in FIG. 5(b), the PS-PORT 55 undergoes a transition to the SND state if said message transmission request SND-RQ is input in a A state in which the message transmission request SND-RQ from the MSC 62 is waited. In this SND state, the message block is transmitted to the system bus 32 via the SNDC 59.

In this SND state, a transition takes place to the WAIT state by the normal signal SND-ACK from the SNDC 59 or to the CMP state by the abnormal signal SND-ERR. In addition, a transition takes place to the A state after withdrawing the request to the SNDC 59 when there is the CANCEL request from the MSC 62.

The above WAIT state is the state in which the status reception from the receiving side processing module is waited. When the status reception complete signal STS-RCV-ACK is input from the reception control unit (RCVC) 60 in this WAIT state or, when the status reception time is out, a state transition takes place to the CMP state. In this CMP state, the transmission complete is transmitted to the MSC 62, and the resumption of the process is requested. A state transition takes place to the A state when the recognition signal (=transmission request) to the MSC 62 from the PS-PORT-55 in the CMP state is withdrawn.

On the other hand, when the physical receiving port (PR-PORT) 56 receives the reception start notification by the storage of the transmitting message block into the holding buffer belonging thereto according to the process of the reception control unit (RCVC) 60, the physical receiving port 56 is logically connected to the logical receiving port 53 which is to receive according to the control process of the main sequence control unit (MSC) 62. After completion of the operation of the logical receiving port 53, the physical receiving port 56 executes the process of issuing the answer transmission request STS-SND-REQ of the reception completion to the transmission control unit (SNDC) 59.

Figure 6A:
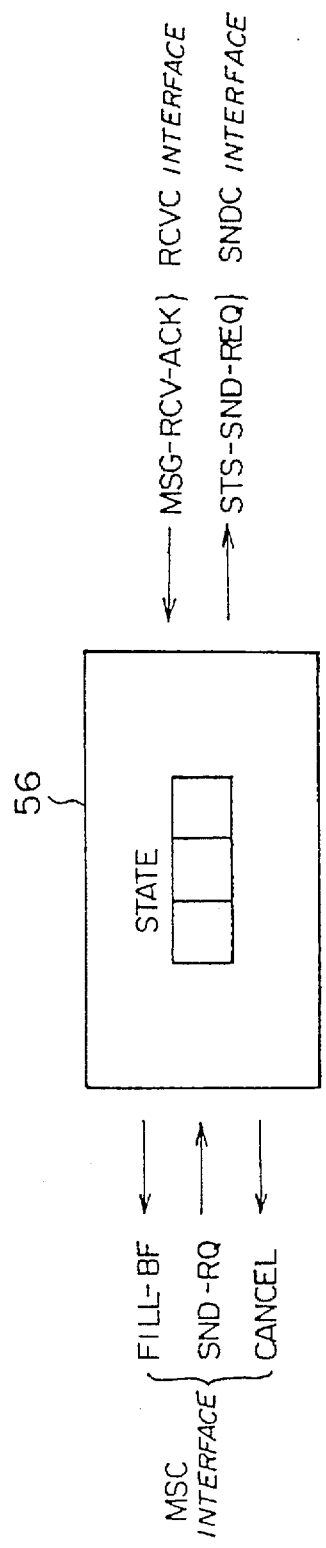
FIG. 6 is an operation state transition diagram of input and output signals in an embodiment of a physical receiving port according to the present invention.
Figure 6B:
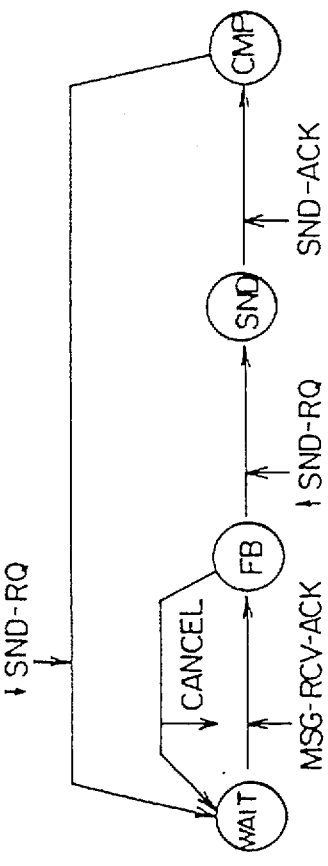

The input and output signals of this physical receiving port (PR-PORT) 56 are shown in FIG. 6(a), and an embodiment of the state transition of the process is shown in FIG. 6(b). As shown in FIG. 6(a), the message reception start signal MSG-RCV-ACK from the reception control unit (RCVC) 60 is input to the physical receiving port (PR-PORT) 56 other than the above answer transmission request STS-SND-REQ. In addition, the status transmission request SND-RQ from the main sequence control unit (MSC) 62 is input to the physical receiving port 56, and the physical receiving port 56 outputs the cancel request CANCEL and the FB state signal FILL.BF with respect to the MSC 62.

As shown in FIG. 6(b), when the message reception start signal MSG-RCV-ACK from the RCVC 60 is input to the PR-PORT 56 in the WAIT state in which the message reception is waited, a state transition takes place to the FB state. This FB state transmits the reception start to the MSC 62 by the above FILL.BF, and is a state which requests the start of the process. After notifying the reception complete signal of the RCVC 60, the PR-PORT 56 makes a transition to the SND state by the status transmission request SND-RQ of the MSC 62. Further, when there is the CANCEL request from the RCVC 60, a state transition takes place to the WAIT state after withdrawing the request to the MSC 62.

The above SND state is a state in which the status block is transmitted to the system bus 32 via the SNDC 59. In this SND state, the PR-PORT 56 makes a state transition to the CMP state by the transmission complete signal SND-ACK from the SNDC 59. This CMP state transmits the transmission completion to the MSC 62, and is a state in which the resumption of the process is requested. When the recognition signal (=transmission request) from the MSC 62 is withdrawn in this CMP state, the PR-PORT 56 makes a state transition to the above WAIT state.

Returning again to the description of FIG. 4, the access control unit (BSC) 57 carries out a control when the connection unit 43 becomes the bus slave of the internal bus 44, and is provided with functions such as the function of decoding the address information of the specified register and the function of carrying out a control to match the timing with the internal bus 44. The access control unit 57 notifies the data information from the side of the internal bus 44 to the logical transmitting port 51 or the logical receiving port 53, and notifies the data information from the side of the logical transmitting port 51 or the logical receiving port 53 to the internal bus 44.

When the connection unit 43 becomes the bus master of the internal bus 44, the memory access control unit (DMAC) 58 makes direct access to the local storage unit 42 according to the indication from the main sequence control unit (MSC) 62 and executes the data transfer between the local storage unit 42 and the dual port RAM 61.

FIG. 7 shows an embodiment of the input and output signals of this DMAC 58 which includes a block number counter 70 and the like. The DMAC 58 is provided with functions such as the function of generating the address information for making the access and the function of carrying out a control to match the timing with the internal bus 44.

The transmission control unit 59 makes the transmission start request to the common system bus 32 and the control of each transmission (transmission of message block/ transmission of answer) according to the requests of the physical transmitting port 55 and the physical receiving port 56. The reception control unit 60 monitors the common system bus 32, and stores the data in the corresponding address of the dual port RAM 61 if the message block or answer is intended for its own unit number. Then, the reception control unit 60 carries out the process of notifying the logical transmitting port 51 or the logical receiving port 53 via the physical transmitting port 55 or the physical receiving port 56.

The work regions for the logical transmitting port 51 and the logical receiving port 53 are provided in the dual port RAM 61 in addition to the above described holding buffer. The access to this dual port RAM 61 is made by the main sequence control unit (MSC) 62 from the bus control part which is on the side of the PM internal bus 44 and is formed by the logical transmitting port 51, the logical receiving port 53, the access control unit 57 and the memory access control unit 58. The access to this dual port RAM 61 is also made from the bus control part which is on the side of the common system bus 32 and is formed by the physical transmitting port 55, the physical receiving port 56, the transmission control unit 59 and the reception control unit 60. The main sequence control unit (MSC) 62, the dual port RAM 61 and the like realize each of the above means 23 to 35.

Figure 8:
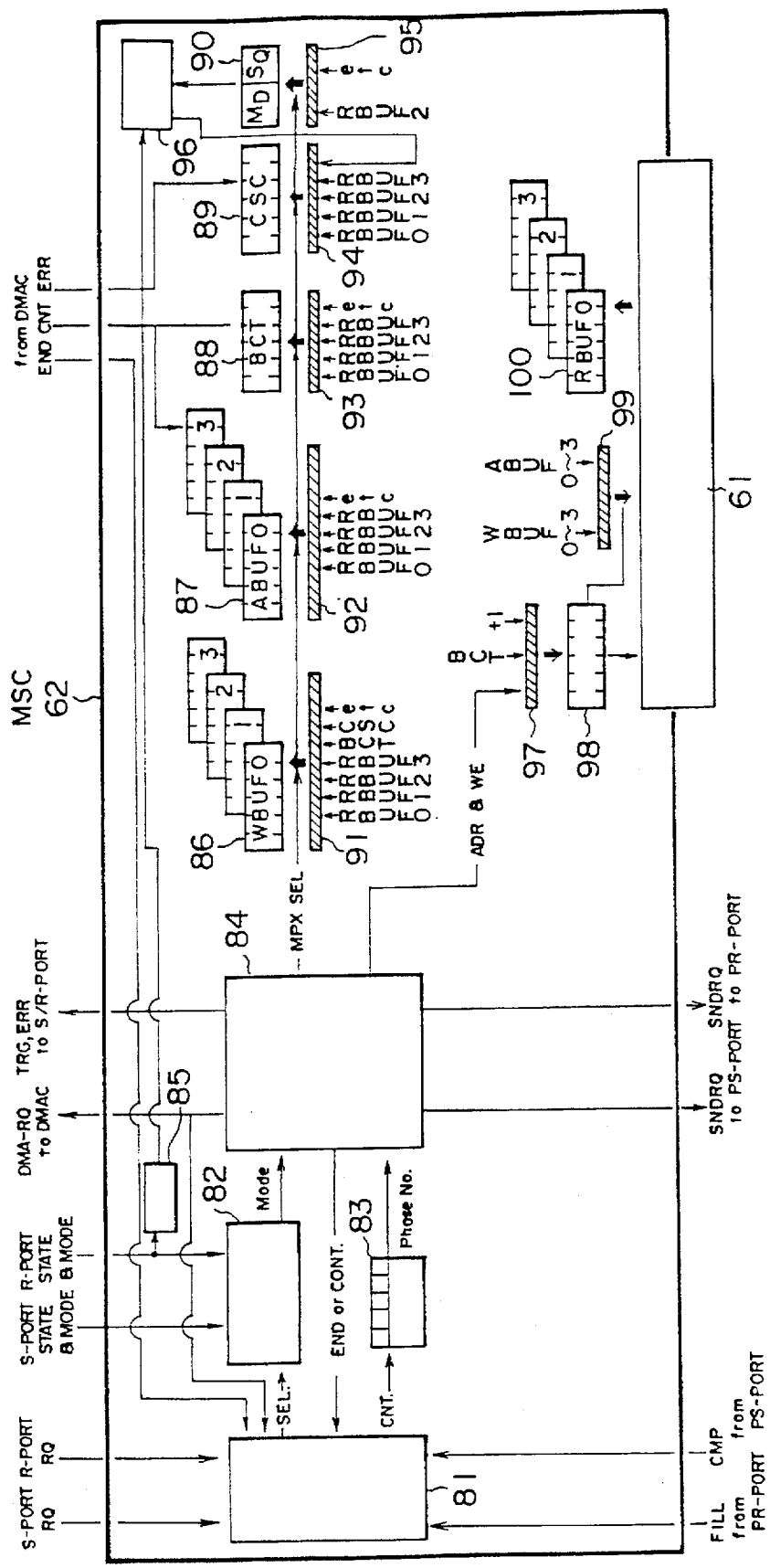
FIG. 8 is a structural diagram of an embodiment of a main sequence control unit according to the present invention.

FIG. 8 shows a structural diagram of an embodiment of the above main sequence control unit (MSC) 62. As shown in this figure, the MSC 62 includes an arbiter 81, a mode decoder 82, a phase sequence counter 83, a main decoder 84, a generator 85, a work buffer (WBUF) 86, an address buffer (ABUF) 87, a byte counter buffer (BCT) 88, an end code buffer (CSC) 89, a buffer 90, selectors 91 to 95, 97 and 99, a comparator 96, a RAM address buffer 98, a RAM buffer 100 and the like.

The selectors 91 to 95 and 97 are respectively provided in correspondence with the input sides of the buffers 86 to 90 and 98, and switch and output the data from the RAM buffer 100 based on a select signal from the main decoder 84. The selector 91 also selectively output the data from the BCT 88 and the CSC 89. In addition, the selector 94 selects and outputs the output signal of the comparator 96 to the CSC 89. Furthermore, the selector 99 selects and supplies each output data of the WBUF 86 and the ABUF 87 to the dual port RAM 61. This dual port RAM 61 is used as the work area of the MSC 62 as described above. In this MSC 62, the arbiter 81 receives the process request RQ from the S-PORT 51 or the R-PORT 53 or the state notification from the PS-PORT 55 or the PR-PORT 56, and selects the same according to an appropriate priority sequence. The phase sequence counter 83 starts to operate from the time when this selection is made. In addition, the operation mode is determined depending on the selected port and the state of this port.

Next, the MSC 62 successively selects and processes the information from the dual port RAM 61 according to the phase which is determined by the determined operation mode and the output value of the phase sequence counter 83. The information is extracted to each buffer group of the WBUF 86, the ABUF 87, the BCT 88 and the CSC 89, and is written into the dual port RAM 61 again. Moreover, the DMAC 58 shown in FIG. 5 is activated if necessary during this procedure.

The MSC 62 activates the S-PORT 51, the R-PORT 53, the PS-PORT 55 or the PR-PORT 56 during or at the end of the above phase depending on the operation mode. At the end of the above phase, the MSC 62 transmits an end signal from the main decoder 84 to the arbiter 81 to release the arbiter 81. In addition, the MSC 62 supplies a trigger signal or an error signal to the S-PORT 51 and the R-PORT 53 so as to make a state transition of each port. Depending on the situation, the main decoder 84 outputs a control signal to the arbiter 81 and continues the next process with the same port.

Next, a description will be given of an activation interface between hardware/software.

Figure 9:
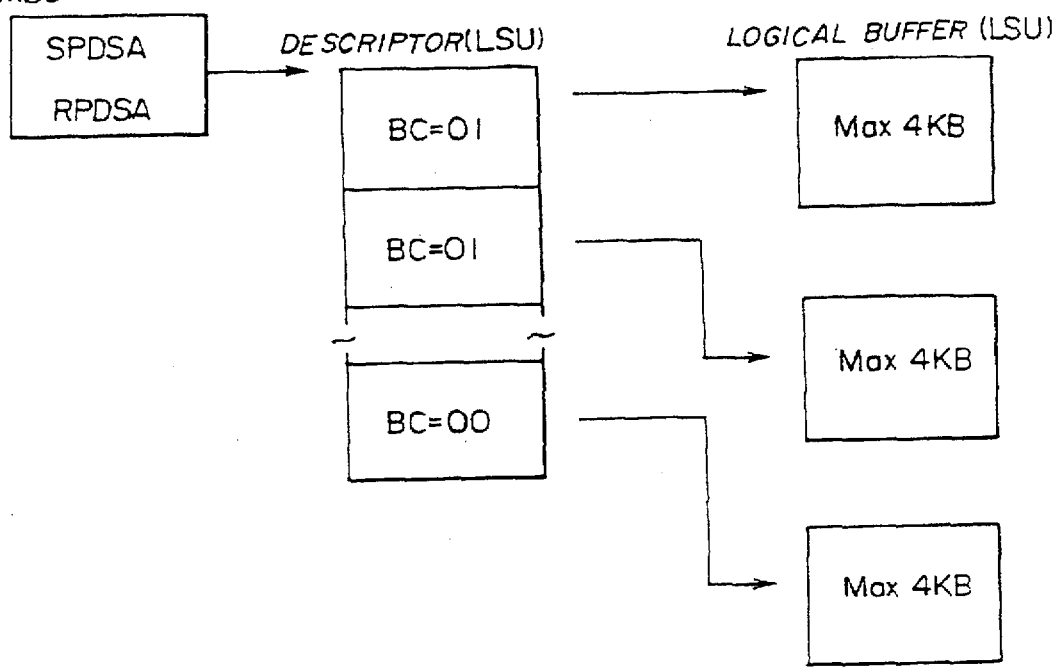
FIG. 9 is a diagram which shows an embodiment of a descriptor according to the present invention.

The software which runs on the central processing unit 41 shown in FIG. 3 arranges the descriptor which indicates the detailed control contents in the logical storage unit 42 when activating the S-PORT 51 or the R-PORT 53. FIG. 9 shows an embodiment of the structure of this descriptor.

The descriptor (15 in FIG. 1) arranged in the local storage unit (LSU) 42 takes the same structure for the S-PORT 51 and the R-PORT 53, and is arranged in a sequential format as shown in FIG. 9 taking 16 bytes as one entry or in a branch format.

The head entry of this descriptor is pointed by the address information which is set in the regions "SPDSA" and "RPDSA" within the control registers (52 and 54 shown in FIG. 4) in the S-PORT 51/R-PORT 53. Each entry is written with the address information, size information and the like of the logical buffer (for example, each having a capacity of 4 kbytes) in the local storage unit (LSU) 42.

Figure 10:
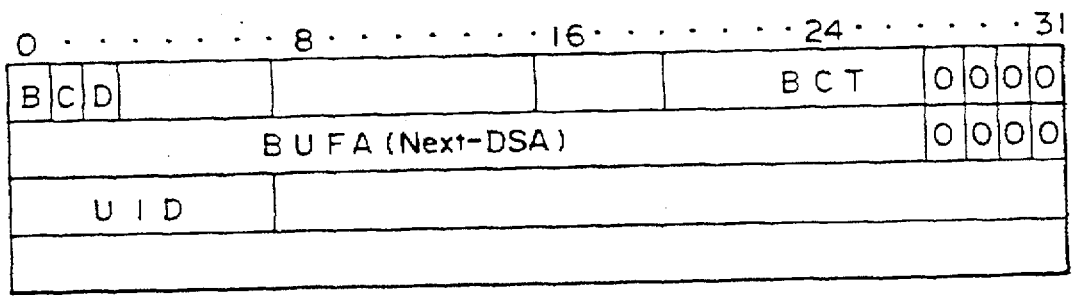
FIG. 10 is a diagram which shows an embodiment for managing data of an entry of the descriptor shown in FIG. 9.

FIG. 10 shows an embodiment of the entry managing data of this descriptor. The combination of the B bit and C bit in this figure indicates continuation to the next entry which is sequentially arranged after the processing of the instant entry ends if "BC=01", indicates the branching to the entry which is indicated by the instant entry if "BC=11", indicates the end of the process after the processing of the instant entry ends if "BC=I00", and indicates the end of the process without executing the process of the instant entry if "BC=10". In addition, the D bit in FIG. 10 indicates the existence or non-existence of an interrupt to the software at the time when the processing of the instant entry is completed.

In FIG. 10, the 1-byte information field indicated by "BCT", the information field indicated by "BUFA" and the information field indicated by "UID" have contents which differ for the S-PORT 51 and the R-PORT 53.

In the entry managing data of the descriptor for the S-PORT 51, the byte size (units of 16 bytes, maximum of 4 kbytes) of the logical buffer in the local storage unit 42 treated by the instant entry is stored in the PCT information field, the head address (16-byte boundary address) of said logical buffer is stored in the BUFA information field, and the unit number of the connection unit (MBC) 43 of the transmitting processing module is stored in the UID information field.

On the other hand, in the entry managing data of the descriptor for the R-PORT 53, the size information of the logical buffer depending on the communication mode is stored in the BCT information field, the head address of the logical buffer in the local storage unit 42 treated by the instant entry is stored in the BUFA information field, and the unit number of the connection unit 43 of the transmitting processing module received is stored in the UID information field.

In the above communication mode, there is the ANY mode and the SPECIFIC mode. The ANY mode is the mode in which an arbitrary message transmitted therefor is received, and there is a level 0 which is used for the normal communication process and a level 1 which is used for the emergency communication process. The SPECIFIC mode is the mode in which an agreement is made in advance between the transmitting side and the receiving side, and the large amount of messages which are the subject of the transmission is directly communicated to the specified address region and not the general buffer. In the above entry managing data for the R-PORT 53, the size information of the received message is stored in the BCT information field in the ANY mode and predetermined size information is stored in the BCT information field in the SPECIFIC mode.

If the BC bits specify the branching of the entry, the branching address information of the entry is stored in the BUFA information field, but nothing is specified in the BCT information field and the UID information field.

The software which runs on the central processing unit 41 writes the control indication in the control register 52 of the S-PORT 51 if the descriptor is arranged in the local storage unit 42 and the S-PORT 51 is next activated. In addition, when activating the R-PORT 53, the software writes the control indication in the control register 54 of the R-PORT 53.

FIG. 11 shows an embodiment of the control indication data set in the control register 52 of the S-PORT 51, and FIG. 12 shows an embodiment of the control indication data set in the control register 54 of the R-PORT 53. In FIG. 11, "SPDSA", "SPODF" and "SPFCP" are the regions in which the software running on the central processing unit 41 writes. The software writes the address information DSA of the first descriptor which starts the control in this "SPDSA", the indication of communication mode in which the communication process is to be carried out among the level 0 of the ANY mode, the level 1 of the ANY mode and the SPECIFIC mode in "SPODF", and the indication of the forced end during operation in "SPFCP".

In addition, in FIG. 11, "SPOPS" and "SPCST" are the regions in which the software writes on the side of the connection unit 43 and then reads. The connection unit 43 writes the entry address information CDSA of the descriptor which is in being processed in the "SPOPS", and writes the end state information CSC in the "SPCST". When the write access to the described "SPODF" is executed, the S-PORT 51 is activated.

On the other hand, in FIG. 12, "RPDSA", "RPODF", "RPFCP" and "RPSSI" are the regions in which the software running on the central processing unit 41 writes. The software writes the address information of the first descriptor which starts the control in the region "RPDSA", writes the indication of the operation mode in "RPODF", writes the indication of the forced end during operation in "RPFCP", and writes the unit number of the transmitting connection unit 43 which is specified in the case of the SPECIFIC mode before the start.

In addition, in FIG. 12, "RPOSP" and "RPCST" are the regions in which the software writes on the side of the connection unit 43 and then reads. The connection unit 43 writes the entry address information CDSA of the descriptor within the processing signal in "RPOPS", and writes the end State information CSC in "RPSCT". When the write access to the described "RPODF" is executed, the R-PORT 53 is activated. The unit number written in "RPSSI" is used to decide whether or not the message is from the connection unit 43 specified as the transmitting source when making the reception process in the SPECIFIC mode.

The software which runs on the central processing unit 41 must specify and start the communication mode to the level 0 of the ANY mode for at least one of the two R-PORTs 53 which are provided in order to execute the normal communication process. This software must specify and start the communication mode to the level 1 of the ANY mode for at least one of the two R-PORTs 53 in order to execute the emergency communication process. By making this preparation, it is possible to communicate the emergency message without confusing it with the normal message.

The software of each processing module activates the S-PORT 51 at any time when the transmission process in the ANY mode becomes necessary. In this case, the unit number of the connection unit 43 of the transmitting destination set in the UID information field of the entry of the descriptor for the S-PORT 51 can be set independently for each entry. If a plurality of S-PORTs 51 are provided, the unit number can also be set independently for each S-PORT 51. Hence, the software can carry out the transmission process with respect to a plurality of processing modules 30 at the same time.

In addition, when carrying out the communication process in the SPECIFIC mode (hereinafter referred to as the SPC mode), the software of the transmitting side processing module 30 must notify the receiving side processing module 30 in advance using the ANY mode to advise that the communication will be carried out in the SPC mode and the byte length of this communication. The software of the receiving side processing module 30 makes the preparations for the reception when the above notification is received, including the arranging of the descriptor and the activation of the R-PORT 53, and thereafter returns an answer message to the transmitting side processing module 30. When the software of the transmitting side processing module 30 confirms this answer message, the S-PORT 51 is activated in the SPC mode and the communication process in the SPC mode is executed.

Next, a detailed description will be given of the data transfer system between the processing modules 30.

In this embodiment, it is assumed that the byte size of the logical buffer which can be specified by one entry of the descriptor is 4 kbytes (units of 16 bytes) at the maximum, and thus, the maximum length of the message which can be specified by one entry of the descriptor is 4 kbytes. On the other hand, the unit of the message which can be transferred at one time on the common system bus 32 is 256 bytes, for example, and is relatively small.

The connection unit 43 of this embodiment carries out the transfer by dividing the message into parts of 256 bytes which is the transfer unit of the common system bus 32, and the odds are transferred in the last block. The transmitting side connection unit 43 adds identifiers F(First)/M(Middle) /L(Last)/S(Single) to each transfer unit on the common system bus 32 in order to identify the first block, the middle block and the last block of the series of messages. On the other hand, the receiving side connection unit 43 carries out the process of reassembling the message which is transmitted according to this identifier.

Other than the identifier, the transmitting side connection unit 43 adds the communication mode, the unit number of itself which is the transmitting source, the unit number of the connection unit 43 at the transmitting destination, the byte length to be transmitted and the port number (may be omitted) of the S-PORT 51 at the transmitting source to the command and transmits the transmitting message.

Figure 13A:
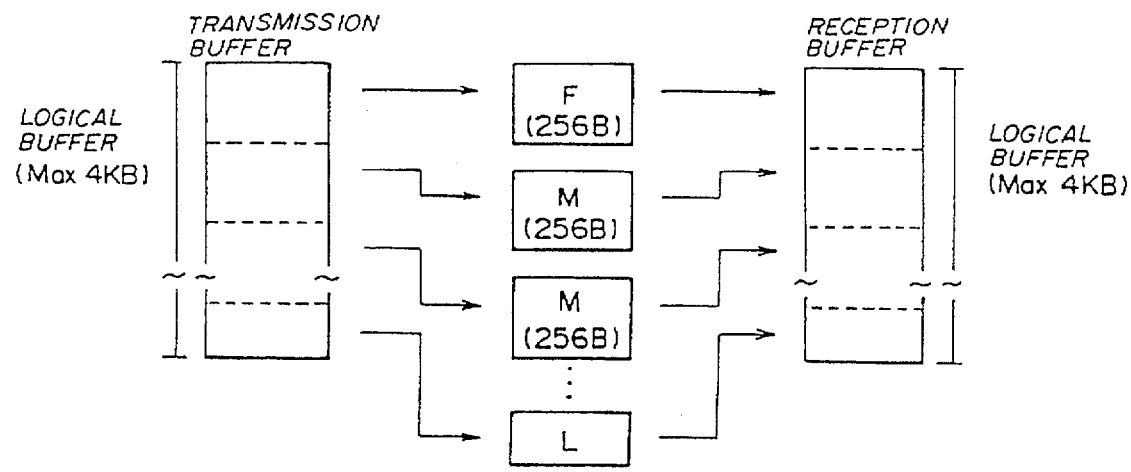
FIG. 13 is a diagram which shows a message block transfer in an ANY mode according to the present invention.

In the ANY mode, the message in the logical buffer specified by each entry of the descriptor is treated as the message forming one transfer unit, and is transferred to the processing module 30 at the communication destination. In the case of this ANY mode, if the length of the message to be transferred exceeds 256×2 bytes, the connection unit 43 transfers the message amounting to the first 256 bytes by adding the identifier F as shown in FIG. 13(a), thereafter successively transfers in 256 bytes by adding the identifier M, and finally transfers the odds amounting to the remaining bytes by adding the identifier L.

Figure 13B:
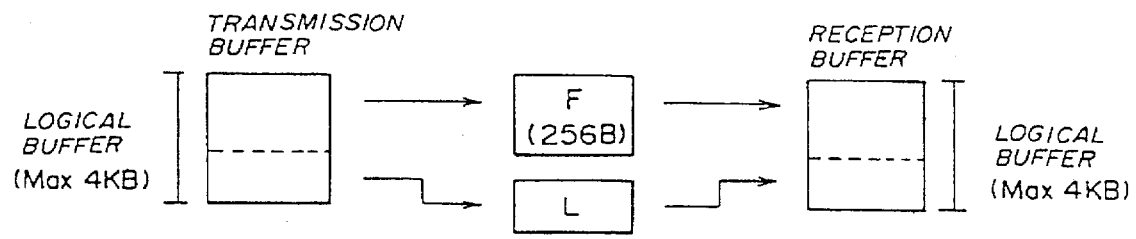
Figure 13C:
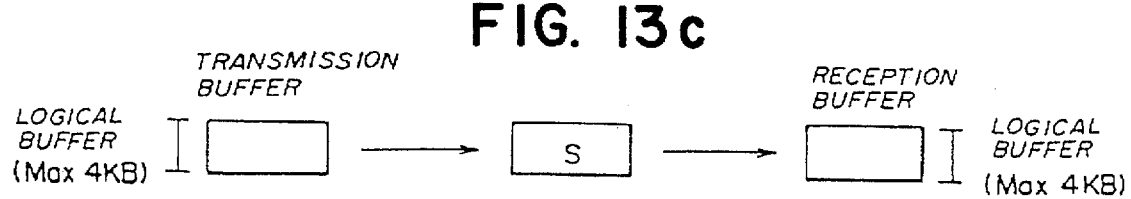

If the length of the message to be transferred falls between 256 bytes and 256×2 bytes, the connection unit 43 transfers the message amounting to the first 256 bytes by adding the identifier F as shown in FIG. 13(b), and then transfers the odds amounting to the remaining bytes by adding the identifier L. In addition, if length of the message to be transferred is less than or equal to 256 bytes, the message amounting to this number of bytes is transferred by adding the identifier S as shown in FIG. 13(c).

Hence, in the ANY mode, the transfer process ends with the transfer of the series of F to L blocks or the transfer of the single S block at both the transmitting and receiving sides. Moreover, the F and M blocks are constantly transferred in 256 bytes, and the S and L blocks are transferred in 256 bytes or less.

On the other hand, in the SPC mode, the entire message in the logical buffer which is specified by the entry connected to the descriptor chain is treated as the message forming one transfer unit, and is transferred to the logical buffer which is connected by the chain of the processing module 30 at the transmitting destination.

The SCP mode employs such a transfer system to enable transmission in the fine division, so that it is possible to reduce the overhead required for the re-transfer of data within the local storage unit 42 at the transmitting and receiving sides necessary because the logical buffer is a general buffer as in the case of the ANY mode, and furthermore, so that the message having a large quantity can be transmitted without being affected by the size of the logical buffer which is generally provided.

Figure 14:
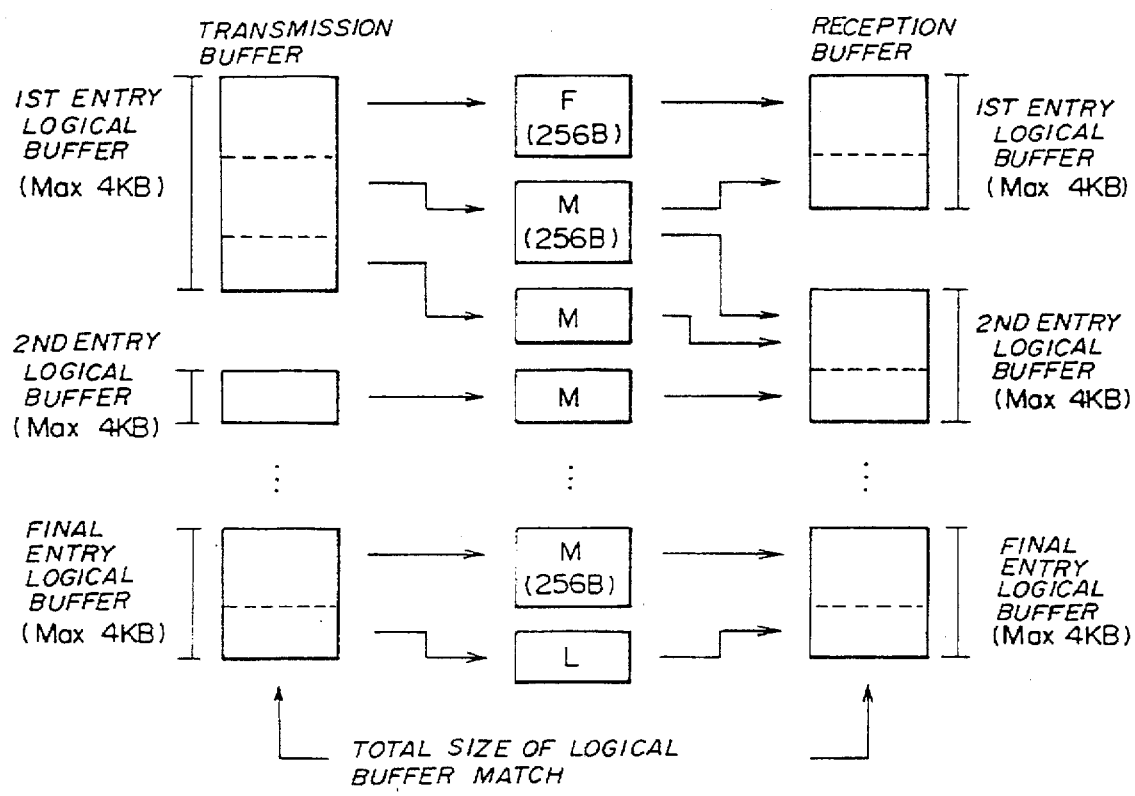
FIG. 14 is a diagram which shows a message block transfer in a SPECIFIC mode according to the present invention.

In the case of this SPC mode, the first block of the first entry is the F block, the last block of the last entry is the L block, and the other middle entries are the M blocks as shown in FIG. 14. The connection unit 43 of the transmitting side transfers as one transfer block the unit of 256 bytes or the entry to the buffer boundary. In addition, the connection unit 43 of the receiving side carries out the store process of the next entry into the logical buffer if the buffer boundary of the entry is detected during the transferring block.

In the SPC mode, the F and M blocks are not necessarily limited to 256 bytes, and the renewal of the entry at the transmitting and receiving sides are not always synchronized. However, the total size of the logical buffer for all entries on the transmitting side of course matches the total size of the logical buffer for all entries on the receiving side. In the present invention, a means is provided to confirm this match so as to detect the redundant or missing message in the SCP mode.

In the present invention, the logical connection between the transmitting side S-PORT 51 and the receiving side R-PORT 53 during communication of the series of messages starts by the transmission and reception of the F block and ends with the transmission and reception of the L block. The connection information related to this logical connection is held in the transmitting side S-PORT 51 and the receiving side R-PORT 53.

Generally, the plurality of S-PORTs 51 of each connection unit 43 simultaneously have the logical connection relationship to the R-PORTs 53 of other connection units 43.

The MSC 62 of each connection unit 43 switches the physical transmitting port (PS-PORT) 55 of its connection unit 43. This switching process is executed in units of one entry of the descriptor. The processes of the plurality of PS-PORTs 55 of each connection unit 43 are alternately executed in entry units and serialized by the switching process of this MSC 62.

In the ANY mode, the logical connection relationship between the transmitting side S-PORT 51 and the receiving side R-PORT 53 ends for every entry unit. On the other hand, in the SPC mode, since one message is formed by a plurality of entries, the switching of the PS-PORT 55 is carried out in a state where the logical connection between the transmitting side S-PORT 51 and the receiving side R-PORT 53 is maintained during the message unit.

Figure 15:
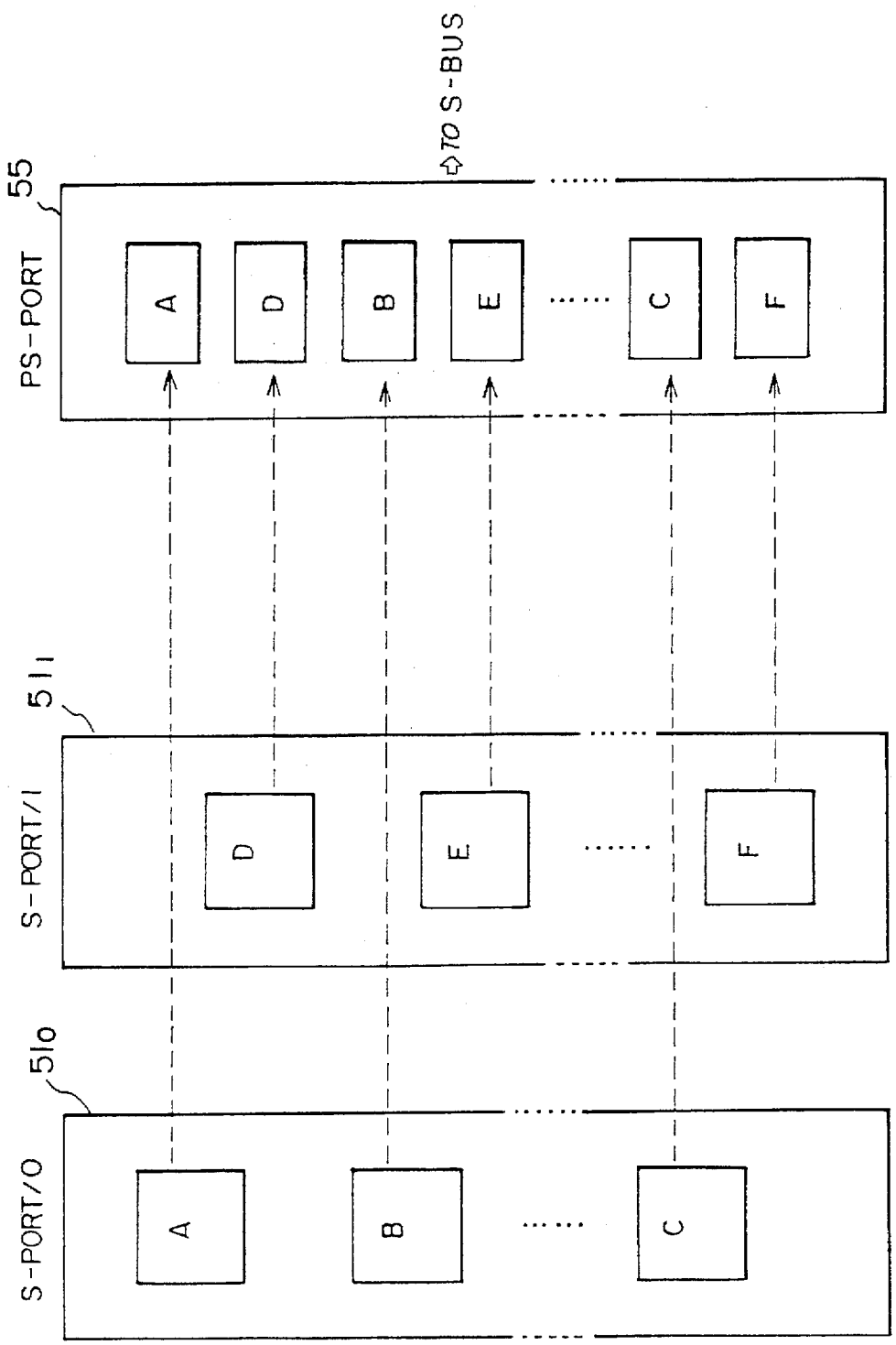
FIG. 15 is a diagram which shows a physical transmitting port switching process.

FIG. 15 shows an example of the switching process of the PS-PORT 55. That is, the PS-PORT 55 first transmits the message of the entry A of the logical transmitting port (S-PORT) $51_0$ having the number 0, then transmits the message of the entry D of the logical transmitting port (S-PORT) $51_1$ having the number 1, transmits the message of the entry B of the S-PORT $51_0$, next transmits the message of the entry E of the S-PORT $51_1$, and similarly carries out the process of alternately switching the output message of the S-PORTs $51_0$ and $51_1$.

Accordingly, when the two S-PORTs $51_0$ and $51_1$ are activated, a process is carried out so as to execute the transmission process of the two S-PORTs $51_0$ and $51_1$ to which the activation request is made. The PS-PORT 55 is disconnected from the R-PORT 53 at the communication destination for every transfer block depending on the protocol of the common system bus 32. By the control process of the MSC 62, a process is carried out so as not to connect to the S-PORT $51_0$ or $51_1$ to the PS-PORT 55 until the transmission of all the message of one entry is completed.

The PR-PORT 56 of each connection unit 43 notifies the start of the reception to the MSC 62 when the message block is received. When this notification is received, the MSC 62 first identifies the connection unit 43 which is the transmitting source. Further, if the communication mode is the ANY mode and no R-PORT 53 has the logical connection relationship to the identified connection unit 43, the MSC 62 carries out a control so as to receive the message block by the R-PORT which matches the level of the transmitted message block.

The message block which is received in this case must be the F block or the S block, and this logical connection continues as a normal one if the received message block is the F block or the S block. On the other hand, if the received message block is the M block or the L block, some kind of protocol error exists, and the MSC 62 notifies this to the connection unit 43 at the transmitting source via the PR-PORT 56 and the transmission control unit (SNDC) 59, and does not connect to any of the R-PORTs 53 which can make a reception. In addition, if there does not exist any R-PORT 53 which can make a reception, this is notified to the connection unit 43 at the transmitting source.

On the other hand, if the communication mode is the ANY mode and the logical connection relationship exists between one of the R-PORTs 53 and the identified connection unit 43, the MSC 62 carries out a control so as to receive the message by this R-PORT 53. The message block which is received in this case must be the M block or the L block, and thus, this logical connection is continued as a normal one if the received message block is the M block and the logical connection is ended as a normal one if the received message block is the L block.

But if the received message block is the F block or the S block, some kind of protocol error exists, and the MSC 62 informs this to the connection unit 43 at the transmitting source via the PR-PORT 56 and the SNDC 59, and an abnormal end is made of the received R-PORT 53.

If the communication mode is the SPC mode, one of the R-PORTs 53 is prepared to receive the message block from the connection unit 43 at the transmitting source, and thus, the MSC 62 carries out a control so as to receive the message block by this R-PORT 53. In the SPC mode, similarly as in the case of the ANY mode, the first block is the F block or the S block, and the block ends with the L block after a succession of the M blocks. In the case of the SPC mode, a temporary interruption is generated in the message which is transmitted depending on the renewal of the entry at the transmitting and receiving sides and the alternating process by the PS-PORT 55 in entry units caused thereby. In the SPC mode, it is also not permitted to have a plurality of logical connection relationships at the same time between the plurality of S-PORTs 51 of the same connection unit 43.

Normally, the transfer blocks of the message from the S-PORT 51 of other connection units 43 are transferred to the PR-PORT 56 of each connection unit 43. For this reason, the SMC 62 of each connection unit 43 must distribute the transfer block which is transferred to the R-PORTs 53 of its connection unit 43.

This distributing process is executed in units of transfer blocks which are the input unit while referring to the logical connection information managed by the R-PORT 53. The plurality of R-PORTs 53 of each connection unit 43 accurately receive the series of messages depending on the distribution process of this MSC 62.

Figure 16:
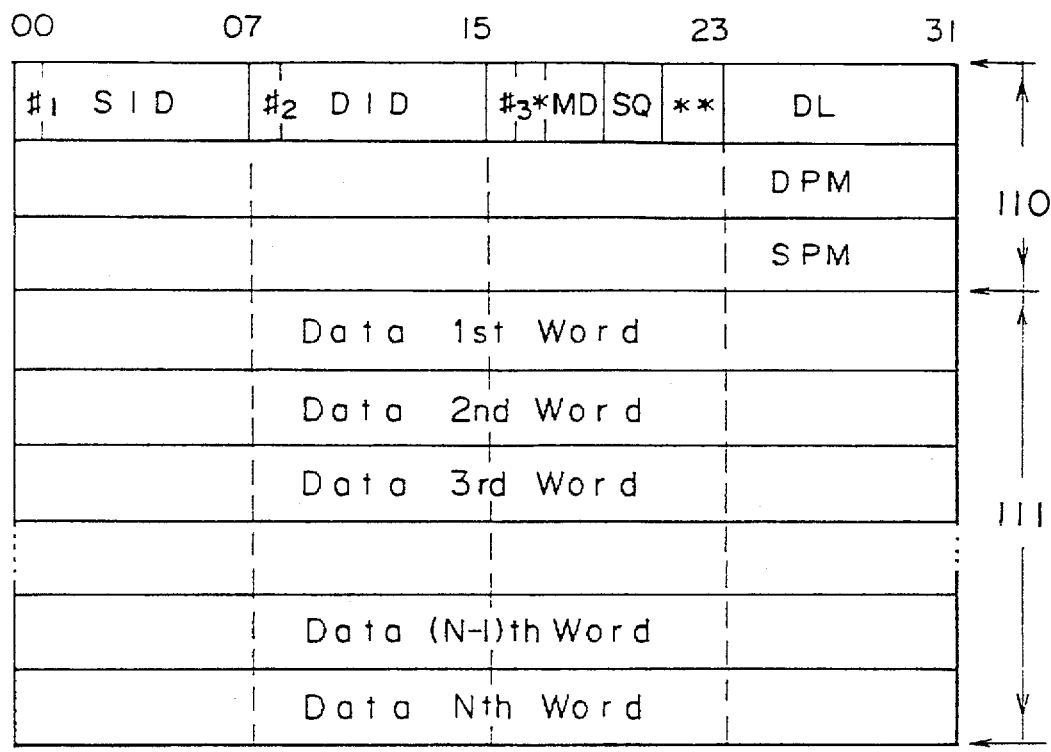
FIG. 16 is a diagram which shows an example of a data format of a message block on a system bus according to the present invention.

The above logical connection information is inserted in the header part of the command block (message). FIG. 16 shows an example of the format of the message block on the system bus 32. As shown in this figure, the message block is made up of a header part 110 and a data part 111. The data part 111 is made up of N words of data, where one word is made up of 4 bytes.

The 3 bits #1 to #3 within the header part 110 indicates the kind of transfer block, and indicates the message block when "010". In addition, SID and DID respectively indicate the source identifier and the destination identifier. The source identifier SID is an ID on the system bus of the transmission bus controller of the transfer block, and indicates the connection unit 43 of the transmission processing module in the case where the transfer block is the message block. The destination identifier DID is an ID on the system bus of the reception bus controller of the transfer block, and indicates the connection unit 43 of the reception processing module in the case where the transfer block is the message block.

In addition, MD is a 2-bit identifier which indicates whether the mode is the ANY mode or the SPC mode, and indicates the ANY 0 mode if "00", the ANY 1 mode if "01" and the SPC mode if "10". SQ is a 2-bit block identifier and indicates the S block if "00", the F block if "01", the M block if "10" and the L block if "11". The buffer 90 within the MSC 62 shown in FIG. 8 described above stores the identifiers MD and SQ, and compares them in the comparator 96 with the signal from the generator 85 indicating whether the F block or the M block is waited.

In addition, in FIG. 16, DL indicates the block length (length of data part 111) of the message block. DPM is a reception processing module ID of the message, and is normally identical to the above DID. SPM is a transmission processing module ID of the message, and is normally identical to the above SID.

Figure 17:
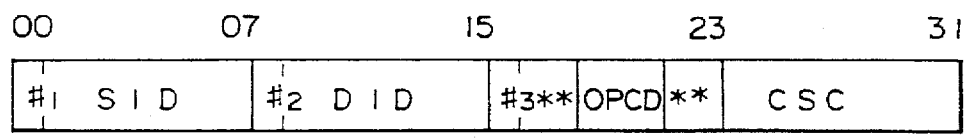
FIG. 17 is a diagram which shows an example of a data format of a status block on the system bus according to the present invention.

The status block on the system bus 32 indicating the process result of the received message has a format shown in FIG. 17. In this figure, the 3 bits #1 to #3 indicates the kind of transfer block, and the status block is indicated if "111". In addition, the source identifier SID is an ID on the system bus 32 of the transmission bus controller of the transfer block, and indicates the connection unit 43 of the reception processing module in the case of the status with respect to the message block, contrary to the SID of the message block.

The destination identifier DID is an ID on the system bus 32 of the reception bus controller of the transfer block, and indicates the connection unit 43 of the transmission processing module in the case of the status wit respect to the message block. The 3-bit identifier OPCD indicates the transfer block to which the status belongs, and is the status block with respect to the message block if "010". Further, the code CSC indicates the process result within the reception processing module with respect to the transferred message block.

Next, a description will be given of an example of the distribution process of the PR-PORT 56 by referring to FIG. 18. The message blocks $A_F$, $B_F$, $C_F$, $A_{M1}$, $B_{M1}$, $C_{M1}$, ... are alternately input to the number 0 PR-PORT $56_0$ and the number 1 PR-PORT $56_1$. The alphabets A, B, C and the like indicates the kind of message block, that is, examples of the connection units 43 of the message transmission processing module. In addition, the subscripts F, M and L indicate the above F block, M block and L block.

The MSC 62 distributes the transfer block $A_F$ which is transferred first to the number 0 P-PORT $53_0$ based on the SID and SPM of FIG. 16. Next, the transfer block $B_F$ transferred from the PR-PORT $56_1$ is distributed to the number 1 R-PORT 53 the transfer block $C_F$ transferred from the PR-PORT $56_0$ is distributed to the number 2 R-PORT $53_2$, and distributes the transfer block $A_{M1}$ transferred from the PR-PORT $56_1$ to the number 0 R-PORT $53_0$.

Figure 18:
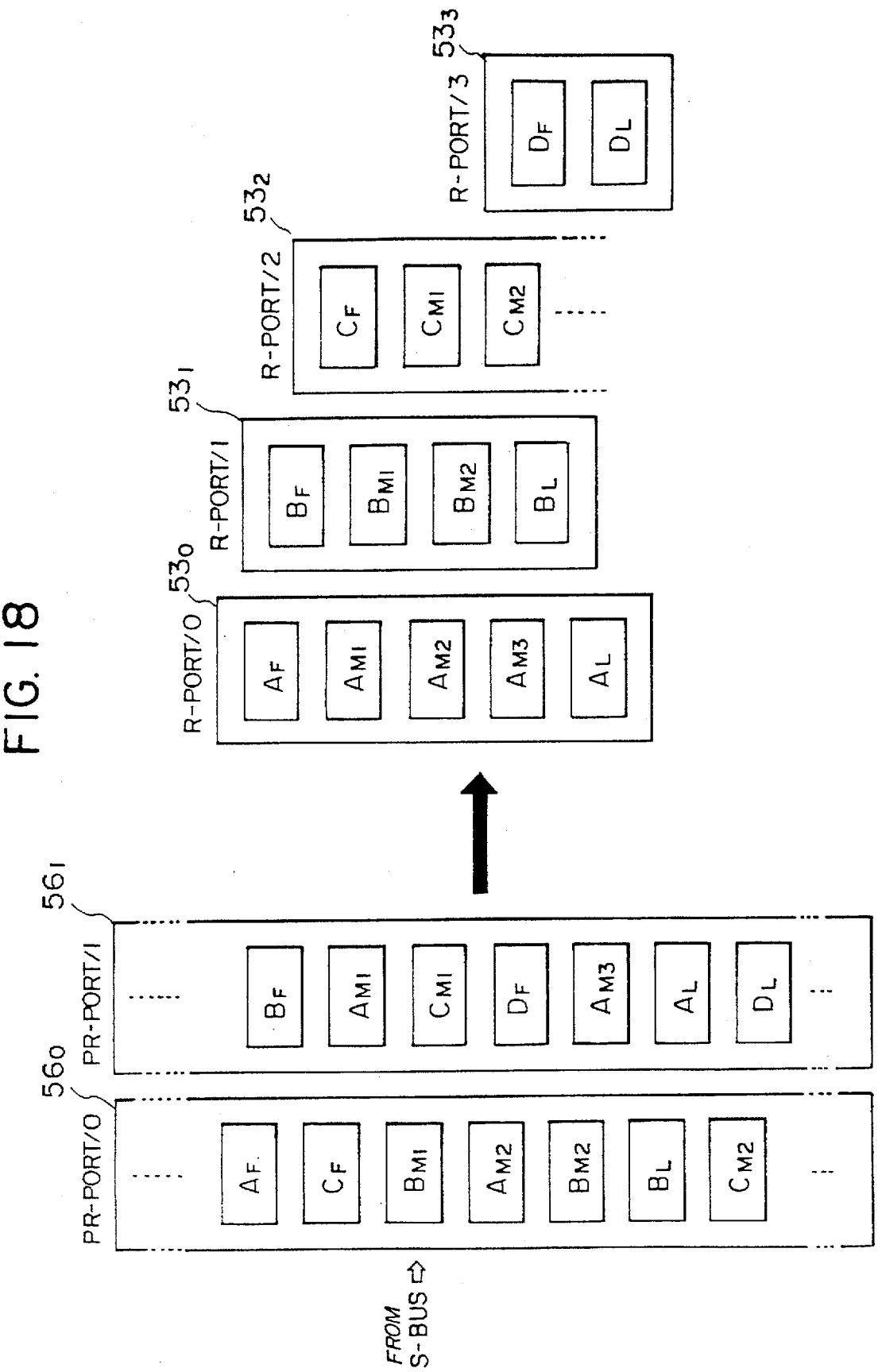
FIG. 18 is a diagram which shows a physical receiving port distributing process according to the present invention.

Accordingly, the messages are transferred to the R-PORTs $53_0$ to $53_3$ in sequence for every message control as shown in FIG. 18, and it is possible to execute an accurate reception process of the message.

Next, a detailed description will be given of the fault processing of an essential part of this embodiment.

The abnormalities which may be generated during the series of message communication processes of the present invention can roughly be categorized into hardware error within the transmitting side processing module 30, the hardware error within the receiving side processing module 30, the hardware error during the transfer on the common system bus 32, the software error of the transmitting side processing module 30 including the flow control disturbance and the like, and the software error of the receiving side processing module 30 including the flow control disturbance and the like.

The abnormality detection is carried out at various parts of the transmitting side connection unit 43, the common system bus 32 and the receiving side connection unit 43. Normally, before the logical connection between the transmitting side and the receiving side starts, the abnormality which is triggered and started by the start of the operation of the transmitting side is notified only to the software of the transmitting side processing module 30. In addition, the abnormality caused by the receiving operation is notified only to the software of the receiving side processing module 30.

On the other hand, after the logical connection between the transmitting side and the receiving side is generated, it is necessary to promptly release this logical connection state when some kind of fault is generated. For example, if the logical connection state is released only on the transmitting side and not on the receiving side, there is a possibility that the receiving side R-PORT 53 may hang up. In order to avoid such a situation, a hardware function is provided to release both logical connection states as much as possible. If the release is not possible by use of said hardware function alone, there is provided a hardware function which cooperates with the software to release the logical connection states.

Figure 19:
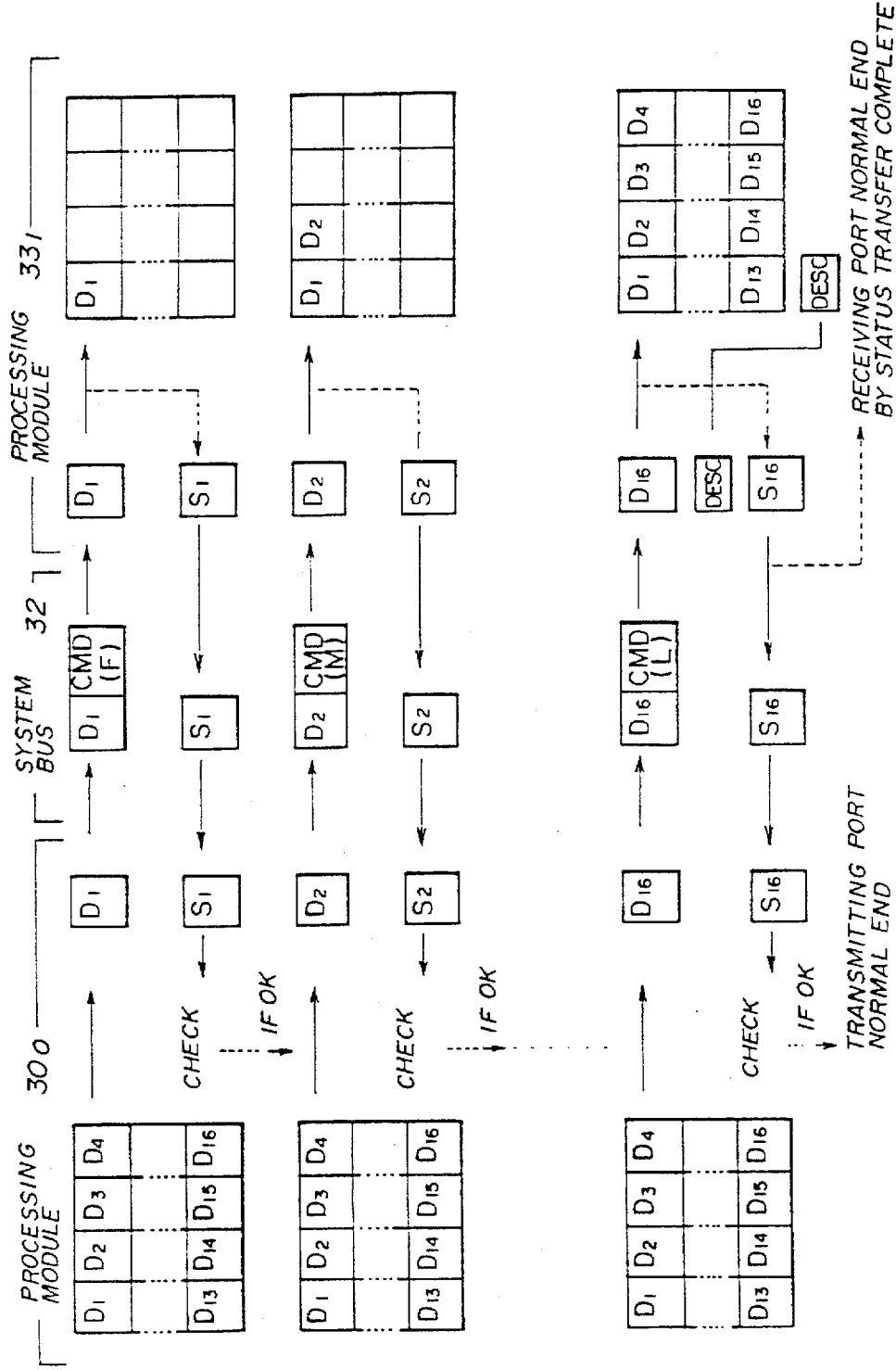
FIG. 19 is a diagram which shows a data transfer side between processing modules at the time of a normal end according to the present invention.
Figure 20:
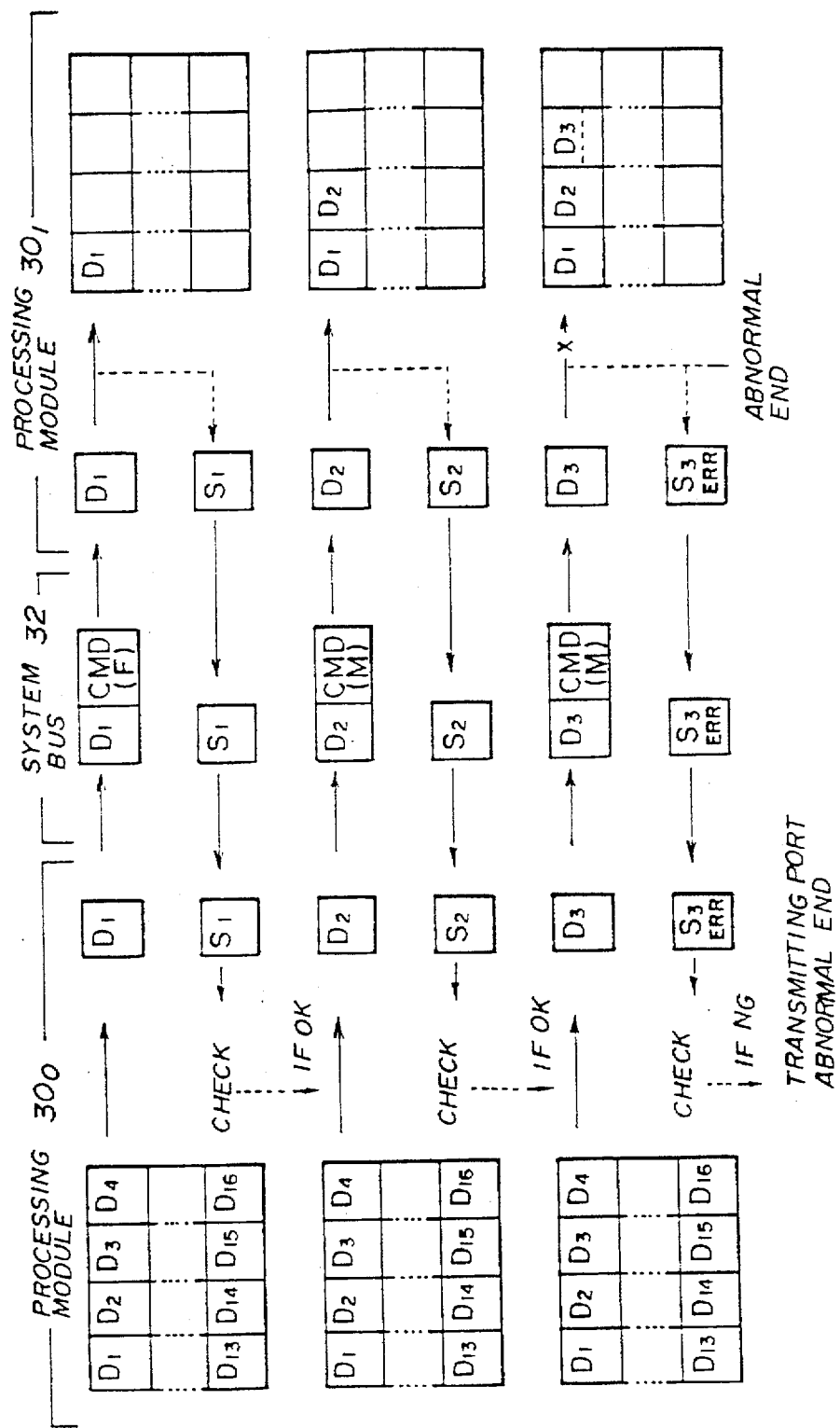
FIG. 20 is a diagram which shows a data transfer side between the processing modules at the time of an abnormal end according to the present invention.

The common system bus 32 in this case employs the split type, and the message communication includes the transfer of the message block having the data format shown in FIG. 19 from the transmitting side to the receiving side, and the transfer of the status block having the data format shown in FIG. 20 from the receiving side to the transmitting side. The series of logical messages are completed by repeating the message transfer and the status transfer with respect thereto a plurality of times. The faults which may be generated during the logical connection may be categorized into the following 5 kinds.

① Fault which is detected during a message transfer on the common system bus 32;

② Fault which is detected during a status transfer on the common system bus 32;

③ Fault which is detected during an internal process (storage process to the LSU 42 and the like) of the receiving side processing module 30;

④ Fault which is detected during an internal process (read out process from the LSU 42 and the like) of the transmitting side processing module 30; and ⑤ Heavy fault generated in the transmitting side processing module 30.

In the case of the faults ① and ④, the error is notified to the transmitting side processing module 30. Responsive to this notification, the connection unit 43 of the transmitting side processing module 30 releases the logical connection state and notifies this to the software which runs on the central processing unit 41 by an external interrupt.

In response to this notification, the software reads out the end state information CSC which is written in the SPCST register of the control register 52 described in conjunction with FIG. 12, and retransmits the same message to the receiving side processing module 30 according to this detection result. This is because the fault is generated during the message transfer on the common system bus 32 and the logical connection state may still be continued at the receiving side processing module 30.

Responsive to this retransmission, the connection unit 43 of the receiving side processing module 30 detects a protocol violation because the message of the F block is transmitted from the same processing module 30 when the M block or the L block is waited because it is in the logical connection state. Hence, the connection unit 43 releases the logical connection state in accordance therewith, and notifies this to the software which runs on the central processing unit 41 by an external interrupt. By this fault processing, it is possible to release the logical connection state on both the transmitting and receiving sides.

In the case of the fault ②, the error is notified to the receiving side processing module 30. Responsive to this notification, the connection unit 43 of the receiving side processing module 30 releases the logical connection state, and notifies this to the software which runs on the central processing unit 41 by an external interrupt. In this state, the connection unit 43 of the transmitting side processing module 30 anticipates a status transfer and operates a timer for anticipating the status transfer.

If the status transfer is not received even after a constant time elapses, the logical connection state is released by detecting the time out, and an external interrupt is used to notify this to the software which runs on the central processing unit 41. By this fault processing, it is possible to release the logical connection state on both the transmitting and receiving sides.

When the fault ③ is detected and the generation time of this fault is before the status transmission, the connection unit 43 of the receiving side processing module 30 notifies the fault generation to the transmitting side processing module 30 by the status transfer, releases the logical connection state, and further, notifies this to the software which runs on the central processing unit 41 by an external interrupt.

The transmitting side processing module 30 makes an abnormal end upon receipt of the status notifying the fault generation, and notifies this to the software which runs on the central processing unit 41 by an external interrupt. By this fault processing, it is possible to release the logical connection state on both the transmitting and receiving sides.

On the other hand, in the case where the fault generation cannot be notified to the transmitting side processing module 30 by the status transfer due to the generation time of the fault being after the status transfer and the like, the connection unit 43 of the receiving side processing unit 30 releases the logical connection and notifies this to the software which runs on the central processing unit 41 by an external interrupt.

The connection unit 43 of the receiving side processing module 30 is re-started according to the processing of the software which receives this notification, and the F block/S block from the transmitting side processing module 30 is waited. In this state, since the M block or the L block is transmitted from the transmitting side processing module 30, the connection unit 43 of the receiving side processing module 30 notifies the fault generation to the transmitting side processing module 30 by the status transfer.

When this notification is received, the connection unit 43 of the transmitting side processing module 30 releases the logical connection state and notifies this to the software which runs on the central processing unit 41 by an external interrupt. By this fault processing, it is possible to release the logical connection state on both the transmitting and receiving sides.

In the case of the fault ⑤, the receiving side processing module 30 hangs up in the logical connection state because the transmitting side processing module 30 is in the stopped state. In order to save this hang up, the software which runs on the central processing unit 41 of the receiving side processing module 30 periodically makes a polling to the indication information of the RPOPS register of the control register 54 which was described in conjunction with FIG. 13 and is provided so as to indicate the operating state of the R-PORT 53. By this polling, it is detected that the logical connection state is continued for over a predetermined constant time.

The release of the logical connection state is indicated by writing a forced end indication during operation into the RPFCP register of the control register 54 described in conjunction with FIG. 13. By this fault processing, it is possible to eliminate the hang up of the logical connection state of the receiving side processing module 30 caused by the heavy fault of the transmitting side processing module 30.

Next, a further detailed description will be given of the methods of generating and transferring the status which notifies the above fault generation to the transmitting side processing module. The above status transfer is an operation which is carried out for the logical receiving port which receives the command to notify the process result to the logical transmitting port, and the logical transmitting port progresses the transfer of the command progresses while confirming the status. FIG. 19 and FIG. 20 show examples of the data transfer between the processing module $30_0$ and the processing module $30_1$. The examples shows the case where 4 KB data is transferred in the ANY mode. The 4 KB data is transmitted on the system bus 32 in 16 divisions (256 B per division). In FIG. 19 and FIG. 20, $D_1$ to $D_{16}$ describe 256 B data blocks, and are transmitted on the system bus 32 by adding the identifier (CMD: particularly F/M/L). $S_1$ to $S_{16}$ are the status with respect to each CMD.

The operation flow will be described according to FIG. 19. First, the processing module $30_0$ enters $D_1$ in the dual port RAM 61 by DMA transfer, and transmits it on the system bus 32 by adding a common (F in figure). The processing module $30_1$ enters CMD and $D_1$ in the dual port RAM 61 within the connection unit 43, and the MSC 62 activates the logical receiving port 53 by investigating the contents of the CMD within the dual port RAM 61. When the data part $D_1$ is transferred by the DMA transfer, the logical receiving port 53 generates $S_1$ from this result and transfers $S_1$ on the system bus 32 via the dual port RAM 61.

The processing module $30_0$ enters the transferred status $S_1$ and checks its content. If a normal end is confirmed by this check, the processing module $30_0$ enters the next data block $D_2$ in the dual port RAM 61 by DMA transfer, and transmits it on the system bus 32 by adding CMD (M) in the logical transmitting port 51.

The processing module $30_1$ enters CMD (M) and $D_2$ and checks the content of CMD (M), and starts the command reception process by selecting the same logical receiving port which received $D_1$.

When $D_2$ is transferred by the DMA transfer, the logical receiving port 53 generates $S_2$ from this result and transfers $S_2$ on the system bus 32 via the dual port RAM 61. The next data transfer is made if the processing module $30_0$ confirms the normal end from the content of the status $S_2$. The transfer is similarly repeated thereafter, and if the status $S_{15}$ of $D_{15}$ is normal, the last block $D_{16}$ of the entry (4 KB) is transferred to the dual port RAM 61 by DMA transfer and is transmitted on the system bus by adding CMD (L).

When the processing module $30_1$ receives CMD (L) and $D_{16}$, the processing module $30_1$ checks the content of the command and selects the same logical receiving port 53 as before to start the command reception process. Since CMD indicates (L), the logical receiving port 53 checks whether or not the total transfer data length up to that point exceeds one entry (4 KB), and transfers $D_{16}$ by the DMA transfer if it is not exceeded. Further, because one entry ends, the corresponding descriptor entry (DESC) is renewed (BCT and UID are stored), and the status $S_{16}$ is generated from the result up to that point. This status $S_{16}$ is transferred on the system bus 32 via the dual port RAM 61. When the transfer of the status is normally completed, the logical receiving port normally ends (C state). When the processing module $30_0$ enters the status $S_{16}$, the processing module $30_0$ checks its content and the logical transmitting port 51 normally ends (C state) if the content of $S_{16}$ is normal.

Next, the processing example for the abnormal case will be described using FIG. 20. The process is the same as that of the normal case up to the transfer of $D_2$. When transferring $D_3$, it is assumed that an abnormality (for example, address parity error and the like) is generated during the DMA transfer of $D_3$ by the logical receiving port 53. In this case, the DMA transfer is interrupted immediately, a status indicating the abnormality is generated from this result, and this status is transmitted on the system bus 32 via the dual port RAM 61. The logical receiving port 53 abnormally ends (C state) if the status $S_3ERR$ is transferred. The processing module $30_0$ which enters $S_3ERR$ which indicates the abnormality does not carry out an operation with respect to the next data block $D_4$, and abnormally ends (C state) immediately.

There are various kinds of abnormalities (that is, kinds of status) detected by the logical receiving port 53 during the command reception. In any case, the protocol (that is, the progressing of the transfer by the repetition of command→status→check→command→status→check→command→...) on the system bus 32 between the logical transmitting port and the logical receiving port is the same.

Figure 22:
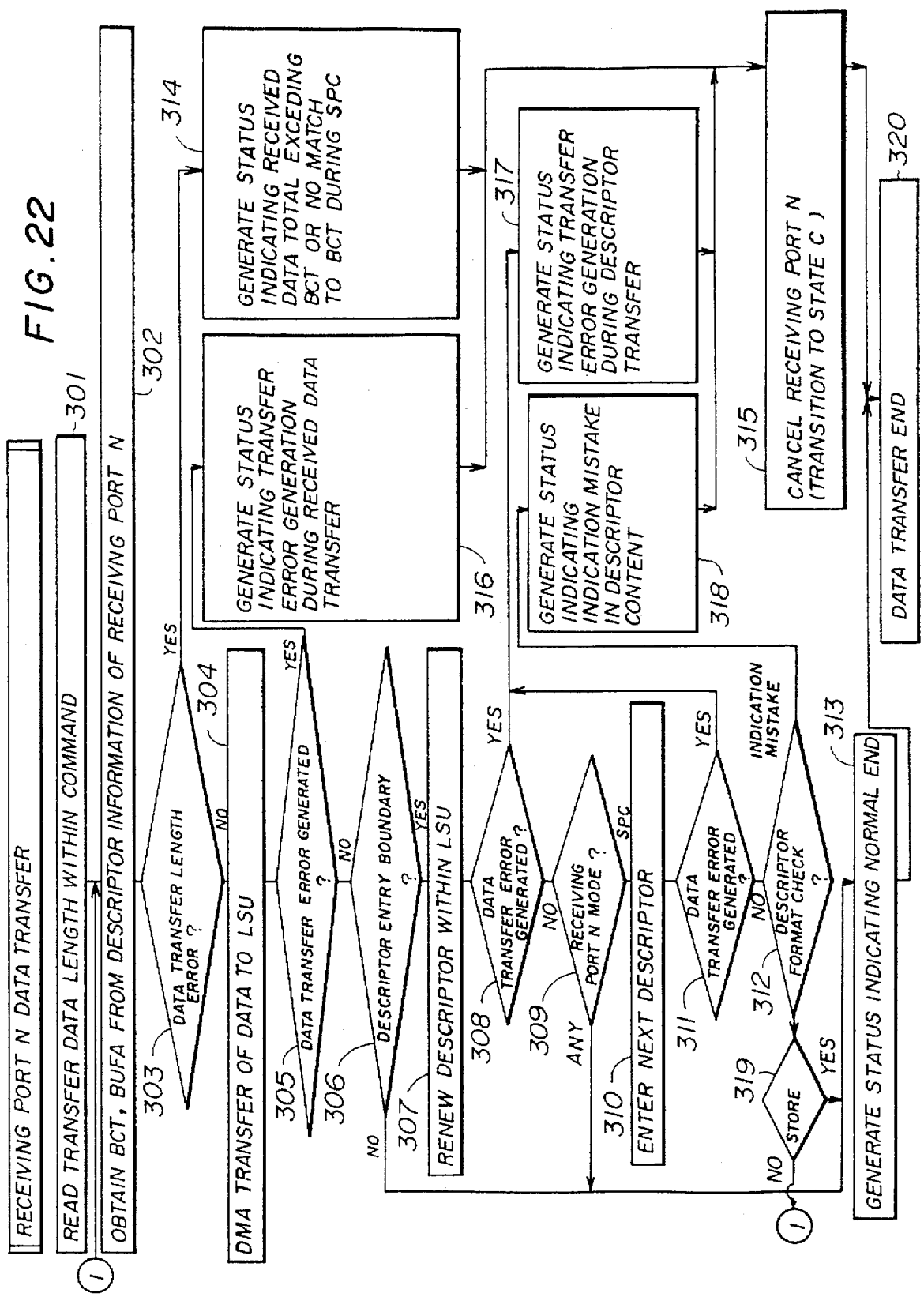
FIG. 22 is a flow chart which illustrates a subroutine in FIG. 21 according to the present invention.

Next, a description will be given of the command processing operation for the case where the logical receiving port 53 receives the command, by referring to FIGS. 21A and 21B and FIG. 22. In FIG. 21A, when the logical receiving port 53 within the processing module 30 receives the command (step 201), the MSC 62 reads the block identifier and the identifier of the transmitting side processing module from the received command (step 202).

If the read block identifier is F or S, the MSC 62 checks the logical connection relationship of the logical receiving port 53 by the processes of steps 205 to 212. That is, after setting the receiving port number N to the first value "1" (step 205), a decision is made to determined whether or not all of the logical receiving ports 53 have been checked (step 206). If no all logical receiving ports 53 have been checked, the MSC 62 decides whether the state of the logical receiving port is the A state, the C state or an other state (step 207). If the logical receiving port is not in the A state or the C state, a decision is made to determined whether the logical receiving port 53 is in the RDY1 state or the RDY2 state which will be described later (step 208).

In the case of the RDY1 state, a decision is made to determined whether the mode of the logical receiving port 53 is the ANY mode or the SPC mode (step 209), and the data of the logical receiving port 53 is transmitted to the dual port RAM 61 as described later if in the ANY mode (step 219).

On the other hand, if the step 208 detects the receiving port state as the RDY2 state and the SPC mode is detected in the step 209, a decision is made to determine whether or not the processing module identifier matches its own identifier (steps 210 and 211). If there is no match, the process advances to the step 212 similarly as in the case where the A state or the C state is detected in the step 207, and the process returns to the step 206 by incrementing the receiving port number N by 1.

In addition, if the block identifier is detected as M or L in the step 203, the MSC 62 checks the logical connection relationship to the logical receiving port 53 by the processes of steps 214 to 217. That is, the receiving port number N is first set to an initial value "1" (step 214), and a decision is made to determined whether or not all of the logical receiving ports have been checked (step 215). If not all logical receiving ports have been checked, a decision is made to determined whether or not the state of the logical receiving port 53 having the receiving port number N is in the RDY2 state (step 216), and a decision is made to determine whether or not the module identifier matches that of itself if in the RDY2 state (step 217). If the logical receiving port 53 having the receiving port number N is in a state other than the RDY2 state (step 216) or, if the module identifiers do not match (step 217), the receiving port number N is incremented by "1" and the next logical receiving port 53 is specified (step 218), and the process thereafter returns to the step 215.

On the other hand, if the check of all logical receiving ports 53 which receive the data block with the block identifier F or S ends (step 206), the process advances to a step 220 shown in FIG. 21B, and a status is generated which cannot be received by all logical receiving ports 53. In addition, the process advances to a step 221 shown in FIG. 21B if the module identifier of the logical receiving port which is in the RDY2 state out of the logical receiving ports 53 which receive the data block wit the block identifier F or S matches that of the command. Hence, a status indicating that the block identifier F or S is received when the block identifier M or L is anticipated, the present receiving port number N is thereafter cancelled in a step 222, and the state of the logical receiving port 53 undergoes a transition to the C state which will be described later (at this time, however, no notification is made to the software).

In addition, if the check of all logical receiving ports 53 which receive the data block with the block identifier M or L ends (step 215), the process advances to a step 223 shown in FIG. 21B, and a status is generated which indicates that the block identifier M or L is received when the block identifier F or S is anticipated.

If the step 209 decides that the received data block at the logical receiving port 53 is of the ANY mode or, if the step 211 or 217 detects the match the module identifiers, the process advances to a step 219, and the data transfer is carried out according to the subroutine of FIG. 22 which will be described later. After this data transfer ends or, if the process of one of the steps 220, 222 and 223 ends, the process advances to a step 224 shown in FIG. 21B, and the MSC 62 requests transmission of the generated status with respect to the physical receiving port (PR-PORT) 56 (step 224).

The status transmission from the physical receiving port 56 is carried out at the above request, and when the status transmission is completed (step 225), the command processing is completed (step 229). On the other hand, if the waiting time is exceeded without completing the status transmission from the physical receiving port 56 (steps 225 and 226), a status which indicates that the status transfer was not completed within a constant time is generated (step 227), the logical receiving port 53 having the receiving port number N undergoes a state transition to the C state (step 228), and the command processing is completed (step 229). If the logical receiving port 53 having the receiving port number N is already in the C state at the step 228, this C state is maintained (a notification is made to the software at this time).

Next, a detailed description will be given of the data transfer by the logical receiving port 53 at the step 219, by referring to FIG. 22. The MSC 62 reads the transfer data length within the command (step 301), and reads out each content of the BCT information field and the BUFA information field from the descriptor information which is held in the control register 54 within the logical receiving port 53 having the receiving port number N (step 302).

Then, a decision is made to determined whether or not a data transfer length error is generated (step 313). If no error is generated, the data is transferred to the LSU 42 by the direct memory access (DMA) transfer (step 304), and thereafter a check is made to determined whether or not the data transfer error is generated at the time of this DMA transfer (step 305). If no data transfer error exists, a decision is made to determined whether or not the transferred data is of the boundary of the descriptor entry (step 306), and if of the boundary the descriptor within the LSU 42 is renewed by the software (step 307).

After checking whether or not the data transfer error is generated when renewing this descriptor (step 308), a decision is made to determined whether the mode of the received data block at the logical receiving port 53 having the receiving port number N is the ANY mode or the SPC mode (step 309). If in the SPC mode, the next descriptor is entered so as to receive the message using the arbitrary form buffer as described above (step 310), and a check is made to determined whether or not the data transfer error is generated (step 311). If no data transfer error exists, the descriptor format is checked (step 312), and a decision is made to determined whether or not all received data are stored in the LSU if there is no indication mistake (step 319). If stored, a status indicating the normal end is generated (step 313), and the data transfer ends (step 320). If not all data are stored in the LSU, the process returns from the step 319 to the step 302.

On the other hand, if the generation of the data transfer length error is detected at the step 303, a status is generated which indicates that the total size of the received data has exceeded the size of the logical buffer given by the BCT information field or that there is no match to the size information from the BCT information field in the SPC mode (step 314). Thereafter, the logical receiving port 53 having the receiving port number N undergoes a state transition to the C state (step 315).

If the data transfer error is detected at the step 305, a status is generated which indicates that the transfer error is generated during the transfer of the received data (step 316), and the process advances to the step 315. In addition, if the data transfer error is generated at the step 308 or 311, a status is generated which indicates that the transfer error is generated during the transfer of the descriptor (step 317), and the process advances to the step 315. Furthermore, if the indication is detected at the step 312, a status is generated which indicates that the content of the descriptor includes an indication mistake (step 318), and the process advances to the step 315.

If the step 306 decides that the transfer data is not the descriptor entry boundary and if the step 309 detects the ANY mode, a status is generated which indicates the normal end (step 313), and the data transfer is thereafter ended (step 320). Even after the logical receiving port 53 undergoes the state transition to the C state at the step 315, the data transfer ends (step 320).

Next, a detailed description will be given of the operation process of the S-PORT 51.

Figure 23:
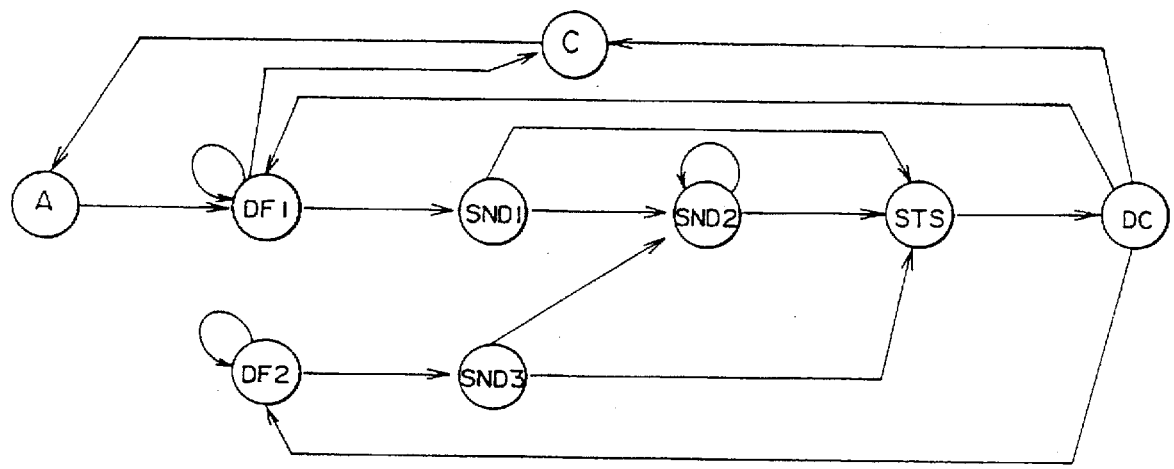
FIG. 23 is a state transition diagram of an embodiment of a logical transmitting port according to the present invention.

The series of transmitting operations according to the indication of the software running on the central processing unit 41 is managed by the S-PORT 51. This S-PORT 51 executes the message transmitting process according to the operation indication to the MSC 62 and the operation indication to the DMAC 58 and the PS-PORT 55 via the MSC 62. FIG. 23 shows a state transition diagram of the process executed by the S-PORT 51. The operation condition of each state of this S-PORT 51 is indicated below.

[A State]

This state waits for the operation indication from the software. A state transition is made to the DF1 state by the write access of the communication mode of the control register 52 with respect to the PODF register.

[DF1 State]

This is a descriptor fetch operation state. By the MSC 62 and the DMAC 58 and according to the address state indicated by the SPCSA register of the control register 52, one entry of the descriptor chain is loaded from the local storage unit 42 to the work region for the logical transmitting port within the dual port RAM 61 to make a state transition to the SND1 state. If the BC bits of the loaded entry indicates the branching, the DF1 state is maintained, and the SPDSA register of the control register 52 is rewritten to the branch address.

[SND1 State]

The transfer block of the first message is fetched from the logical buffer specified by the loaded entry, and a transmission request is issued with respect to the PS-PORT 55. The transfer block which is fetched is stored in the holding buffer of the logical transmitting port provided within the dual port RAM 61. In this case, the block which is transferred is assigned the identifier F or S depending on its block size. If the identifier F is assigned, a state transition to the SND2 state occurs, and a state transition to the STS state occurs if the identifier S is assigned.

[SND2 State]

In correspondence with the common system bus 32 employing the split bus system, the answer with respect to the transferred block is waited, and at the same time, the next transfer block is fetched after receipt of the answer, and the transmission request is issued with respect to the PS-PORT 55. In this case, the identifier M or L is assigned to the block which is transferred. The SND2 state is held if the identifier M is assigned, and a state transition is made to the STS state if the identifier L is assigned.

[STS State]

This state waits for the answer with respect the block which is transferred last. A state transition is made to the DC state after receipt of the answer.

[DC State]

In order to move the processing entry to the next, the SPDSA register of the control register 52 is renewed (16 byte addition). When the continuation of the descriptor is indicated by the BC bits of the entry for which the process is completed, a state transition is made to the DF1 state if the communication mode is the ANY mode and a state transition is made to the DF2 state if the communication mode is the SPC mode. On the other hand, if no continuation is indicated by the BC bits, a state transition is made to the C state.

[DF2 State]

It is the same as the DF1 state excluding the state transition to the SND3 state after completion.

[SND3 State]

The first transfer block is fetched from the logical buffer specified by the loaded entry, so as to issue the transmission request with respect to the PS-PORT 55. The transfer block which is fetched is stored in the holding buffer for the logical transmitting port provided within the dual port RAM 61. Although the entry has been changed, the identifier M or L is assigned to the block which is transferred in correspondence with the SPC mode. A state transition is made to the SND2 state if the identifier M is assigned, and a state transition is made to the STS state if the identifier L is assigned.

[C State]

This is a state in which the series of transfer operations at the S-PORT 51 is ended. A state transition is made to this state also in the case of an abnormal end when various abnormalities are detected at each of the states. A state transition is made to the A state if the fetch operation with respect to the SPCST register (written with in the end information) of the control register 52 is executed by the software.

Next, a detailed description will be given of the operation process of the R-PORT 53.

The series of receiving operations according to the indication of the software running on the central processing unit 41 is managed by the R-PORT 53. This R-PORT 53 executes the message transmission process depending on the operation indication to the MSC 62 and the operation indication to the DMAC 58 and the PR-PORT 56 via the MSC 62.

Figure 24:
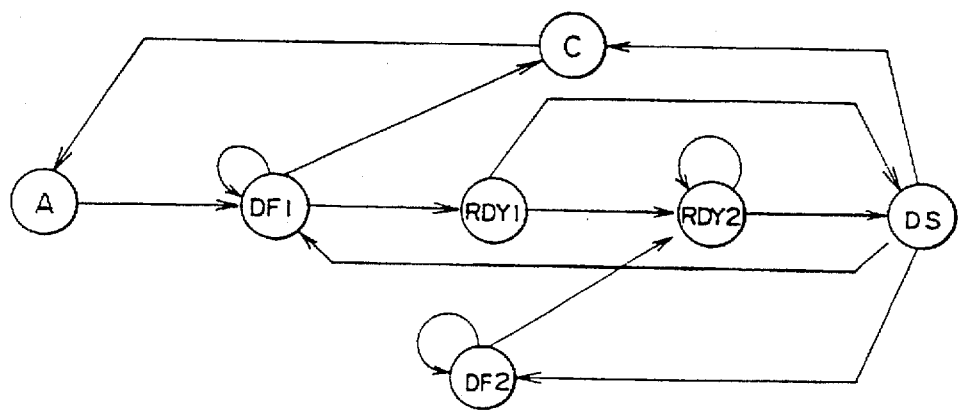
FIG. 24 is a state transition diagram of an embodiment of a logical receiving port.

FIG. 24 shows a state transition diagram of the process executed by this R-PORT 53. The operating conditions at each state of this R-PORT 53 is indicated below.

[A State]

It is a state in which the operation indication from the software is waited. A state transition is made to the DF1 state by the write access of the operation mode with respect to the RPODF register of the control register 54.

[DF State]

It is a descriptor fetch operation state. By the MSC 62 or DMAC 58, one entry of the descriptor chain is loaded to the work region for the logical receiving port within the dual port RAM 61 from the logical storage unit 42 depending on the address information specified by the RPDSA register of the control register 54, and a state transition is made to the RDY1 state.

If the BC bits of the loaded entry indicates the branching, the DF1 state is maintained, and the RPDSA register of the control register 54 is rewritten to the branch address.

[RDY1 State]

It is a state in which the receipt of the transfer block of the first message to the loaded entry is waited. If the identifier of the received transfer block is F or S, the PR-PORT 56 specifies the R-PORT in the matching communication mode out of the R-PORTs 53 in the RDY1 state, and executes a logical connection between this specified R-PORT. When this logical connection is realized, this R-PORT stores the transfer block which is stored in the holding buffer for the logical receiving port provided within the dual port RAM 61 into the logical buffer which is specified by the loaded entry.

After this store process is completed and if the identifier of the received transfer block is F, an answer transmission request is issued to the common system bus 32 to make a state transition to the RDY2 state. If the identifier of the received transfer block is S, a state transition is made to the DS state by holding the answer transmission request to the common system bus 32. If the communication mode is the SPC mode and the block cannot be stored in its entirety into the specified logical buffer, a state transition is made to the DS state during the store operation, and in this case, the answer transmission request to the common system bus 32 is also held.

[RDY2 State]

It is a state of waiting for the receipt of the next transfer block, and the R-PORT 53 already has the logical connection relationship to the S-PORT 51 of another processing module 30. If the identifier of the received transfer block is M or L, the PR-PORT 56 specifies the R-PORT which is to receive out of the R-PORTs 53 in the RDY2 state, and executes a logical connection between this specified R-PORT.

When this logical connection is realized, this R-PORT stores the transfer block which is stored in the holding buffer for the logical receiving port provided within the dual port RAM 61 into the logical buffer which is specified by the loaded entry. After the store process is completed and when the identifier of the received transfer block is M, the RDY2 state is held by issuing the answer transmission request to the common system bus 32. If the identifier of the received transfer block is L, the answer transmission request to the common system bus 32 is held and a state transition is made to the DS state.

If the communication mode is the SPC mode and the block cannot be stored in its entirety into the specific logical buffer, a state transition is made to the DS state during the store operation, and in this case, the answer transmission request to the common system bus 32 is also held.

[DS State]

It is a state of writing the processing situation into the entry after processing of the loaded entry is completed. The information is written into the BCT information field, the UID information field and the like of the entry. Further, the RPDSA register of the control register 54 is renewed (16 byte addition) so as to move the processing entry to the next. If the communication mode is the ANY mode, the answer transmission request to the common system bus 32 held in the RDY1 state or the RDY2 state is issued.

When the continuation of the descriptor is indicated by the BC bits of the entry the processing of which is completed, a state transition is made to the DF1 mode if the communication mode is the ANY mode, and a state transition is made to the DF2 mode if the communication mode is the SPC mode. On the other hand, a state transition is made to the C state if no continuation is indicated by the BC bits.

[DF2 State]

The second and subsequent entries are fetched if the communication mode is the SPC mode, and if necessary, the answer transmission request to the common system bus 32 held in the RDY1 state or the RDY2 state is issued. The rest of the operation is otherwise the same as that for the DF1 state.

[C State]

It is a state in which the series of transfer operations at the R-PORT 53 are ended. A state transition is made to this state also in the case of the abnormal end when various abnormalities are detected in each state. For example, if the MSC 62 detects the transfer of the message of the F block in the RDY2 state of the R-PORT 53, the state of this R-PORT 53 is changed to the C state. A state transition is made to the A state when the fetch operation is executed by the software with respect to the RPCST register (written with end information) of the control register 54.

The construction and operation of the physical transmitting port (PS-PORT) 55, the physical receiving port (PR-PORT) 56, the access control unit (BSC) 57, the memory access control unit (DMAC) 58, the transmission control unit (SNDC) 59, the reception control unit (RCVC) 60 and the main sequence control unit (MSC) 62 which are other constituent units of the connection unit 43 differ depending on the PM internal bus 44 and the common system bus 32 which are actually used. The MSC 57 and the DMAC 58 are dependent on the PM internal bus 44, the PS-PORT 55 and the PR-PORT 56 are dependent on the common system bus 32, and the MSC 62 is dependent on the implement.

Next, a description will be given of the end interface between the hardware and software.

The software which runs on the central processing unit 41 can recognize the progress situation of the processing of each entry of the descriptor chain by the following three means. That is, as the first means, the indication data of the control register 52 belonging to each S-PORT 51 is monitored, and the indication data of the control register 54 belonging to each R-PORT 53 is monitored. The address information in the local storage unit 42 of the entry of the descriptor which is being processed is written into the SPOPS register and the RPOPS register of these control registers 52 and 53 as described above, and the software can be aware of the progress situation of the processing by monitoring such.

As the second means, "1" is set in the D bit of the entry of the descriptor. When "1" is set in the D bit, an external interrupt is made with respect to the software at the time when the processing of this descriptor is completed. Hence, the software can be aware of the progress situation of the processing by this external interrupt.

These two methods are used when the processing of each entry of the descriptor chain is progressing normally. In this case, although the entry of the descriptor of the S-PORT 51 remains the same, a content dependent on the received message is written into the entry of the descriptor of the R-PORT 53.

In other words, in the ANY mode, the received message size is written in the BCT information field of each entry, the next address of the last data is written in the BUFA information field, and the unit number of the connection unit 43 of the processing module 30 at the transmitting source is written in the UID information field. On the other hand, in the SPC mode, only the BUFA information field and the UID information field are rewritten. The software of the receiving side processing module 30 can recognize the message size and the transmitting source based on these information. When the last entry of the descriptor chain is completed, the connection unit 43 generates an external interrupt with respect to the software regardless of the D bit.

As the third means for being aware of the progress situation of the processing, an external interrupt is generated with respect to the software when the abnormality of the process is detected, and the end information describing the content of the abnormality is written into the SPCST register and the RPCST register of the control registers 52 and 54. Hence, the software can be aware of the progress situation of the processing only from this external interrupt, and can be aware of the details of the abnormality content by referring to this end information. The software recognizes the entry in which the abnormality is generated according to the SPOPS register and the RPOPS register of the control registers 52 and 54.

Even in the case where the processing of all entries of the descriptor which is prepared in advance normally ends, an external interrupt is similarly generated with respect to the software. In this case, end information indicating the normal end is indicated by the SPCST register and the RPCST register.

In this embodiment, the software which runs on the central processing unit 41 includes means for indicating the end of the processing of each S-PORT 51 and each R-PORT 53 during the processing of the descriptor chain.

In other words, by writing the indication of the forced end to the SPFCP register of the control register of the S-PORT 51, the software indicates the forced end of the processing of this S-PORT 51. On the other hand, by writing the indication of the forced end to the RPFCP register of the control register 54 of the R-PORT 53, the software indicates the forced end of the processing of this S-PORT 51.

When indicating the end, there are two kinds of forced end modes. One forced end mode indicates the forced end after the processing of the entry which is presently being processed is completed. The other forced end mode indicates the immediate forced end (however, if during reception of the transfer block, the forced end is indicated after completion thereof) regardless of the entry processing state.

When the software indicates the forced end of the processing of the S-PORT 51, the software sets a flag in the "N" region of the SPFCP register of the control register 52 shown in FIG. 11 if executing the forced end according to the former mode. On the other hand, when executing the forced end according to the latter mode, the software sets a flag in the "I" region of the SPFCP register.

In addition, when indicating the forced end of the processing of the R-PORT 53, a flag is set in the "N" region of the RPFCP register of the control register 54 shown in FIG. 12 if executing the forced end according to the former mode. On the other hand, when executing the forced end according to the latter mode, a flag is set in the "I" region of the RPFCP register.

When the indication of the forced end according to the former mode is written in the SPFCP register and the RPFCP register of the control registers 52 and 54 by the software, the MSC 62 executes the forced end process at the time when the completion of the processing of the entry being processed is confirmed by monitoring the progress situation of the processing of the S-PORT 51 and the R-PORT 53.

On the other hand, when the indication of the forced end according to the latter mode is written, the MSC 62 executes the forced end process immediately after completion of the transmission and reception if the transmission and reception are being made, without monitoring the progress situation of the processing of the S-PORT 51 and the R-PORT 53. In other words, the processing state of the S-PORT 51 is forcibly set to the "C State" described above, and the processing state of the R-PORT 53 is forcibly set to the "C State" described above.

Therefore, according to the present invention, a plurality of logical transmitting ports (S-PORTs) 51 and logical receiving ports (R-PORTs) 53 are provided and the logical connection is made between the processing module at the communication destination, so that simultaneous transmission and simultaneous reception of a plurality of messages can be made for the logical transmitting ports 51 and the logical receiving ports 53. Moreover, by specifying the ANY mode from the transmitting side processing module 10 or 30, it is possible to transmit the messages to a plurality of processing modules 10 and 30 at the communication destinations in a transmitting side initiated manner. In addition, by specifying the SPECIFIC mode (SPC mode) from the transmitting side processing module 10 or 30, it is possible to transfer a large amount of message using the arbitrary form buffer 17.

Industrial Applicability

As described above, when making the message communication among a plurality of processing modules forming a loosely coupled multiprocessing system in the message control system for data communication system according to the present invention, it is possible to selectively make the transmitting side initiated message communication and the large amount of message communication. In addition, because it is possible to make the emergency message communication without disturbing the normal message communication process when making the transmitting side initiated message communication, the system is suited for use in a large scale data communication system.

We claim:

1. A message control system which employs a system structure in which a plurality of processing modules are connected to each other via a system bus, each processing module of said plurality of processing modules comprising:

a central processing unit;

a memory unit accessible by said central processing unit;

a connection unit forming an interface between said memory unit and said system bus;

said memory unit including:
- a data processing part implemented as a software system running on said central processing unit, and
- a buffer for storing a transmitting message;

said connection unit including:
- a plurality of logical transmitting ports for successively reading out a message developed in said buffer and transmitting said message as a continuous message,
- a plurality of logical receiving ports for successively storing said message which is transmitted to a destination processing module,
- transmission system connecting means for simultaneously making a logical connection between said plurality of logical transmitting ports and a first processing module at a communicating destination,
- reception system connecting means for simultaneously making a logical connection between said plurality of logical receiving ports and a second processing module at the communicating destination;

the buffer further comprising:
- a general purpose buffer storing said transmitting message, and
- an arbitrary form buffer which is captured at any time by the data processing part which runs on the central processing unit with a format in conformance with processing thereof depending on a capture indication from a transmitting side processing module; and when transmitting said message which is received using the arbitrary form buffer, the data processing part notifies message quantity information to a receiving side processing module according to a message communication which specifies the general purpose buffer prior to the message transmission, and thereafter issues a request to add an identifier which specifies the use of the arbitrary form buffer and a message transmission request with respect to the logical transmitting port within its own processing module.

2. The message control system as claimed in claim 1, wherein said memory unit further includes a descriptor for pointing to data length information and an arrangement address of the arbitrary form buffer in a message storing sequence.

3. The message control system as claimed in claim 1, wherein each said logical transmitting port transmits said message by adding thereto an identifier which specifies which one of said general purpose buffer and said arbitrary form buffer is to be used when the transmitting side processing module receives the message.

4. The message control system as claimed in claim 1 wherein, when transmitting said message by use of the general purpose buffer, each said logical transmitting port transfers said message in units of blocks obtained by dividing said message for every transfer unit of the system bus and transmits each transfer block by adding thereto an identifier for enabling a receiving side processing module to identify whether said transfer block is a first block, a last block or a remaining middle block of a series of messages or that one transfer block itself is a single message.

5. The message control system as claimed in claim 1, wherein at least two or more logical receiving ports of said plurality of logical receiving ports are allocated for processing a normal communication and at least one remaining logical receiving port is allocated for processing an emergency communication.

6. The message control system as claimed in claim 5, wherein each logical transmitting port transmits the message with respect to the transmitting side processing module by adding thereto an identifier which specifies which one of the logical receiving ports, allocated for processing the normal communication, and the logical receiving port, allocated for processing the emergency communication, is to be used.

7. The message control system as claimed in claim 5, wherein a receiving function allocation, of the plurality of logical receiving ports for processing the normal communication and for processing the emergency communication, is carried out by the data processing part.

8. The message control system as claimed in claim 1, wherein the connection unit further comprises:
- a physical transmitting port and a physical receiving port for respectively controlling message transmission and reception;
- an access control unit for processing an interface between the connection unit and an internal bus;
- a memory access control unit for making access to the memory unit;
- a transmission control unit controlling an interface between the connection unit and the system bus with respect to a transmission process;
- a reception control unit controlling an interface between the connection unit and the system bus with respect to the reception process;
- a main sequence control unit controlling the connection unit;
- a memory which is used as a work area of said main sequence control unit; and
- the access control unit, the memory access control unit, the memory and the main sequence control unit forming the transmission system connecting means and the reception system connecting means.

9. The message control system as claimed in claim 1, wherein the said plurality of processing modules and said system bus comprise a loosely coupled multiprocessing system.

10. A message control system which employs a system structure in which a plurality of processing modules are connected to each other via a system bus, where the processing module comprising:

a central processing unit, a memory unit accessible by said central processing unit; and a connection unit forming an interface between said memory unit and the system bus;

said memory unit comprising:
- a data processing part implemented as a software system running on the central processing unit, and
- a buffer storing a transmitting message;

said connection unit comprising:
- a plurality of logical transmitting ports successively reading out a message stored in said buffer and transmitting said message as a continuous message,
- a plurality of logical receiving ports successively storing a message which is transmitted to a destination processing module,
- one or more physical transmitting ports for managing a transmission protocol to the system bus,
- one or more physical receiving ports for managing a reception protocol from the system bus,
- transmission system connecting means for making a logical connection between said plurality of logical transmitting ports and a first processing module at a communicating destination via said transmitting ports, reception system connecting means for making a logical connection between said plurality of logical receiving ports and a second processing module at a communicating destination via said physical receiving ports, the transmission system connecting means carrying out a control so that the logical transmitting ports make a message transmission by using in common the same physical transmitting port by successively renewing the logical connection which is set between the logical transmitting port and the physical transmitting port, and the reception system connecting means carrying out a control so that a message reception is made by successively renewing the logical connection which is set between the logical receiving port and the physical receiving port;

the buffer further comprising a general purpose buffer storing the transmitting message and an arbitrary form buffer which is captured at any time by the data processing part which runs on the central processing unit with a format in conformance with processing thereof depending on a capture indication from a transmitting side processing module; and when transmitting the message which is received using the arbitrary form buffer, the data processing part notifies message quantity information to a receiving side processing module according to a message communication which specifies the general purpose buffer prior to the message transmission, and thereafter issues a request to add an identifier which specifies the use of the arbitrary form buffer and a message transmission request with respect to the logical transmitting port within its own processing module.

11. The message control system as claimed in claim 10, wherein the transmission system connecting means successively repeats a process of switching and setting a new logical connection to a next logical transmitting port, after transmission of a message block or a message of one logical transmitting port which is logically connected to the physical transmitting port ends, out of the plurality of logical transmitting ports.

12. The message control system as claimed in claim 10, wherein the reception system connecting means successively repeats a process of switching and setting a new logical connection to a next physical receiving port, after a transfer process of a received message block from one physical receiving port which is logically connected to the logical receiving port ends if a plurality of physical receiving ports are provided.

13. The message control system as claimed in claim 10, wherein the reception system connecting means sets a new logical connection between the physical receiving port and the logical receiving port which is a receiving destination of a new received message block after a transfer process of a received message block to one logical receiving port which is logically connected to the physical receiving port ends if only one physical receiving port is provided.

14. The message control system as claimed in claim 10, wherein the memory unit includes a descriptor for pointing to data length information and an arrangement address of the arbitrary form buffer in a message storing sequence.

15. The message control system as claimed in claim 10, wherein each logical transmitting port transmits said message by adding thereto an identifier which specifies which one of the general purpose buffer and the arbitrary form buffer is to be used when the transmitting side processing module receives the message.

16. The message control system as claimed in claim 10, wherein when transmitting the message which is received by use of the general purpose buffer, the logical transmitting port transfers said message in units of blocks, obtained by dividing said message for every transfer unit of the system bus, and transmits each transfer block by adding thereto an identifier for enabling a receiving side processing module to identify whether said transfer block is a first block, a last block or a remaining middle block of the series of messages or that one transfer block itself is a single message.

17. The message control system as claimed in claim 10, wherein at least two or more out of the plurality of logical receiving ports are allocated for processing a normal communication and at least one remaining logical transmitting port is allocated for processing an emergency communication.

18. The message control system as claimed in claim 17, wherein each logical transmitting port transmits the message with respect to the transmitting side processing module by adding thereto an identifier which specifies which one of the logical receiving ports, allocated for processing the normal communication, and the logical receiving port, allocated for processing the emergency communication, is to be used.

19. The message control system as claimed in claim 17, wherein a receiving function allocation, of the plurality of logical receiving ports for processing the normal communication and for processing the emergency communication, is carried out by the data processing part.

20. The message control system as claimed in claim 10, wherein the connection unit includes further comprises a physical transmitting port and a physical receiving port for respectively controlling message transmission and reception, an access control unit for processing an interface between the correction unit and an internal bus, a memory access control unit, for making access to the memory unit, a transmission control unit controlling an interface between the connection unit and the system bus with respect to a transmission process, a reception control unit controlling an interface between the connection unit and the system bus with respect to the reception process, a main sequence control unit controlling the entire connection unit, and a memory which is used as a work area of said main sequence control unit, wherein the access control unit, the memory access control unit, the memory and the main sequence control unit form the transmission system connecting means and the reception system connecting means.

21. The message control system as claimed in claim 10, wherein the said plurality of processing modules and said system bus comprise a loosely coupled multiprocessing system.

* * * * *

UNITED STATES PATENT AND TRADEMARK OFFICE
CERTIFICATE OF CORRECTION

PATENT NO. : 5,727,151
DATED : Mar. 10, 1998
INVENTOR(S) : SUGAHARA et al.

It is certified that error appears in the above-identified patent and that said Letters Patent is hereby corrected as shown below:

Col. 1, line 32, after "typical" insert --communication system having a--.

Col. 6, line 6, change "In addition" to --Additionally--.

Col. 19, line 18, change "53" to --$53_1$,--.

Signed and Sealed this

Twenty-third Day of June, 1998

Attest:

BRUCE LEHMAN

*Attesting Officer*            *Commissioner of Patents and Trademarks*